United States Patent
Wang et al.

(10) Patent No.: US 11,796,989 B2
(45) Date of Patent: Oct. 24, 2023

(54) MONITORING SYSTEM AND MONITORING METHOD

(71) Applicant: HITACHI, LTD., Tokyo (JP)

(72) Inventors: Wei Wang, Tokyo (JP); Kojin Yano, Tokyo (JP); Tetsushi Suzuki, Tokyo (JP); Kenichirou Okada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 572 days.

(21) Appl. No.: 17/050,654

(22) PCT Filed: Feb. 8, 2019

(86) PCT No.: PCT/JP2019/004735
§ 371 (c)(1),
(2) Date: Oct. 26, 2020

(87) PCT Pub. No.: WO2020/066052
PCT Pub. Date: Apr. 2, 2020

(65) Prior Publication Data
US 2021/0240174 A1    Aug. 5, 2021

(30) Foreign Application Priority Data
Sep. 27, 2018 (JP) .................. 2018-181281

(51) Int. Cl.
G05B 23/02 (2006.01)
G05B 15/02 (2006.01)
G06N 20/00 (2019.01)

(52) U.S. Cl.
CPC .......... *G05B 23/021* (2013.01); *G06N 20/00* (2019.01); *G05B 15/02* (2013.01)

(58) Field of Classification Search
CPC .............................. G05B 15/02; G05B 23/021
(Continued)

(56) References Cited

U.S. PATENT DOCUMENTS 7,181,374 B1    2/2007 Mosterman et al.
9,378,183 B2 *  6/2016 Tamaki .............. G05B 23/0224
(Continued)

FOREIGN PATENT DOCUMENTS

CN     110275505 A *  9/2019  ........... G05B 19/406
EP     1 724 717 A2    11/2006
(Continued)

OTHER PUBLICATIONS

International Search Report (PCT/ISA/210) issued in PCT Application No. PCT/JP2019/004735 dated May 7, 2019 with English translation (four (4) pages).
(Continued)

*Primary Examiner* — Ronald D Hartman, Jr.
(74) *Attorney, Agent, or Firm* — Crowell & Moring LLP

(57) ABSTRACT

A monitoring system that monitors a monitoring-target system is disclosed. The monitoring system includes one or more storage apparatuses that store a program, and one or more processors that operate according to the program. The one or more processors determine an estimated value of a monitoring-target response variable of the monitoring-target system on a basis of measurement data included in test data of the monitoring-target system and a causal structure model of the monitoring-target system. The one or more processors decide whether an abnormality has occurred in the monitoring-target system on a basis of a result of a comparison between a measurement value of the monitoring-target response variable included in the test data, and the estimated value.

11 Claims, 21 Drawing Sheets

(58) Field of Classification Search
USPC ............................................................ 700/48
See application file for complete search history.

(56) References Cited

U.S. PATENT DOCUMENTS

| | | | |
|---|---|---|---|
| 2008/0219544 A1 | 9/2008 | Tasaki et al. | |
| 2011/0131162 A1 | 6/2011 | Kaushal et al. | |
| 2011/0276828 A1* | 11/2011 | Tamaki | G05B 23/0254 |
| | | | 714/E11.029 |
| 2012/0136629 A1* | 5/2012 | Tamaki | G05B 23/0254 |
| | | | 702/183 |
| 2012/0290879 A1 | 11/2012 | Shibuya et al. | |
| 2017/0010591 A1* | 1/2017 | Fujii | G05B 13/041 |
| 2019/0095300 A1* | 3/2019 | Oba | G06N 20/00 |

FOREIGN PATENT DOCUMENTS

| | | | |
|---|---|---|---|
| EP | 3 358 508 A1 | 8/2018 | |
| JP | 9-269217 A | 10/1997 | |
| JP | 10-238920 A | 9/1998 | |
| JP | 2009-116842 A | 5/2009 | |
| JP | 2011070334 A * | 4/2011 | |
| JP | 2011-517807 A | 6/2011 | |
| JP | 2015190970 A * | 11/2015 | B63B 49/00 |
| JP | 2016-45556 A | 4/2016 | |
| WO | WO 2010/082322 A1 | 7/2010 | |
| WO | WO-2010082322 A1 * | 7/2010 | G05B 23/0254 |
| WO | WO-2011145496 A1 * | 11/2011 | G01M 13/00 |
| WO | WO 2018/140365 A1 | 8/2018 | |

OTHER PUBLICATIONS

Japanese-language Written Opinion (PCT/ISA/237) issued in PCT Application No. PCT/JP2019/004735 dated May 7, 2019 (six (6) pages).
Yano et al., "Data Modeling Technology in Railway Operation and Maintenance", Creating Smart Rail Services Using Digital Technologies, Sep. 2018, pp. 96-100, vol. 100, Issue No. 5, with English Translation (11 pages).
Extended European Search Report issued in European Application No. 19867453.3 dated May 13, 2022 (10 pages).

* cited by examiner

| TIME | STATUS A | STATUS B | STATUS... | DATA A (X1) | DATA B (X2) | DATA... |
|---|---|---|---|---|---|---|
| 16:22 | AB | BB | ... | 2 | 3 | ... |
| ... | ... | ... | ... | ... | ... | ... |

TEST DATA DB

FIG.12
MEASUREMENT VALUE HISTORY AND
ESTIMATED-VALUE HISTORY OF SENSOR A 420
| TIME | MEASUREMENT VALUE | ESTIMATED VALUE ACCORDING TO MODEL | ESTIMATION ACCURACY |
|---|---|---|---|
| 10:00 | 1.70 | 1.71 | 99.5% |
| 10:01 | 1.67 | 1.67 | 100% |
| 10:02 | 1.65 | 1.66 | 99.4% |
| 10:03 | 1.63 | 1.63 | 100% |
| ... | | | |
421
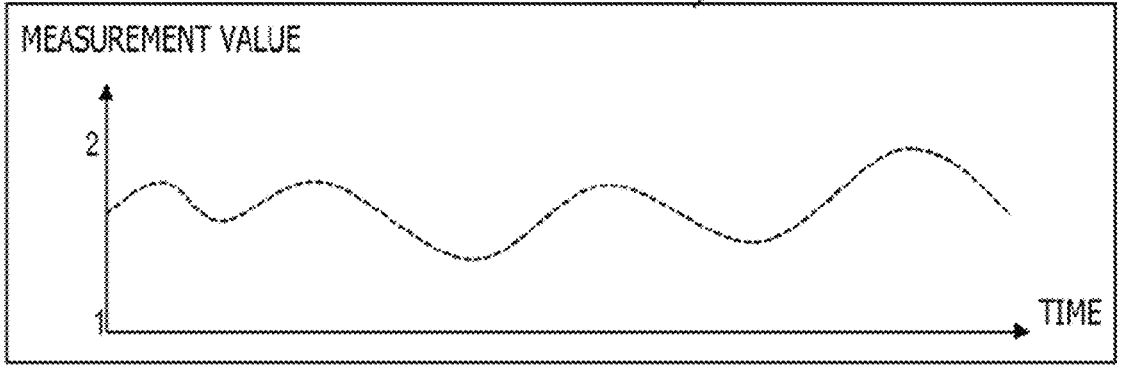
422
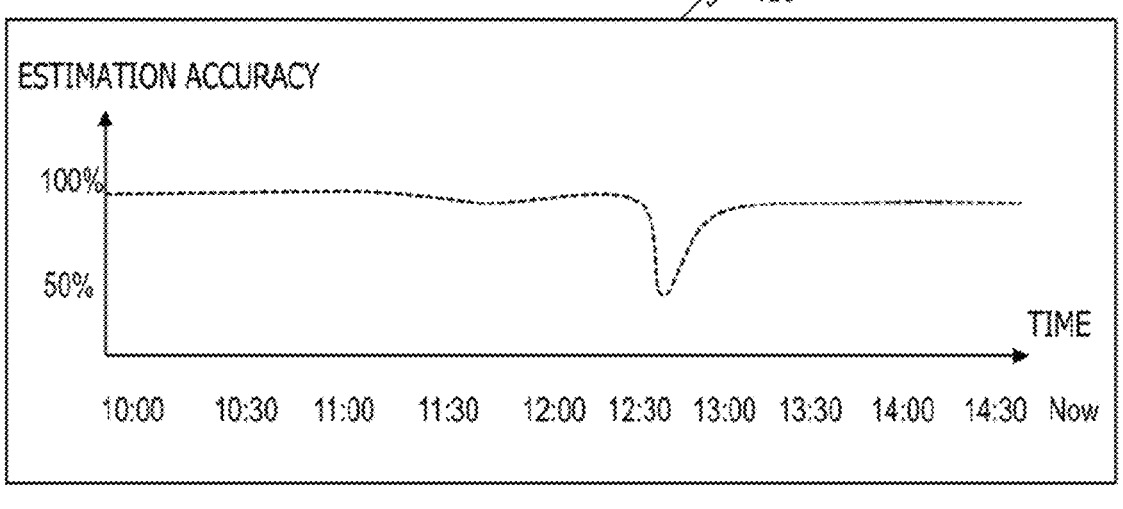
423

| TIME | STATUS A | STATUS B | STATUS... | DATA A | DATA B | DATA... | MAINTENANCE RECORD |
|---|---|---|---|---|---|---|---|
| 12:31 | AA | BA | ... | 1 | 4 | ... | NO |
| 12:32 | AB | BB | ... | 2 | 3 | ... | NO |
| 12:33 | AB | BA | ... | 3 | 4 | ... | MAINTENANCE |
| 12:34 | AA | BA | ... | 4 | 3 | ... | MAINTENANCE |
| ... | ... | ... | ... | ... | ... | ... | ... |

TRAINING DATA DB

OPERATIONAL STATUS 1

| TIME | STATUS A | STATUS B | STATUS... | DATA A | DATA B | DATA... | MAINTENANCE RECORD |
|---|---|---|---|---|---|---|---|
| 12:31 | AA | BA | ... | 1 | 4 | ... | NO |
| 12:34 | AA | BA | ... | 4 | 3 | ... | MAINTENANCE |
| ... | ... | ... | ... | ... | ... | ... | ... |

TRAINING DATA OF OPERATIONAL STATUS 1

| TIME | STATUS A | STATUS B | STATUS ... | DATA A | DATA B | ... | TIME | MAINTENANCE RECORD |
|---|---|---|---|---|---|---|---|---|
| 12:31 | AA | BA | ... | 1 | 4 | ... | 12:31 | NO |
| 12:32 | AB | BB | ... | 2 | 3 | ... | 12:32 | NO |
| 12:33 | AB | BA | ... | 3 | 4 | ... | 12:33 | MAINTENANCE STARTED |
| 12:34 | AA | BA | ... | 4 | 3 | ... | 12:34 | MAINTENANCE ENDED |
| ... | ... | ... | ... | ... | ... | ... | ... | ... |

TRAINING DATA DB $y = a*X1 + b*X2 + c$
$X1 = e*X3 + f*t^2$
$X2 = d*\sqrt{t}$
$X3 = g*t + h*t^2 + i$

FIG.31

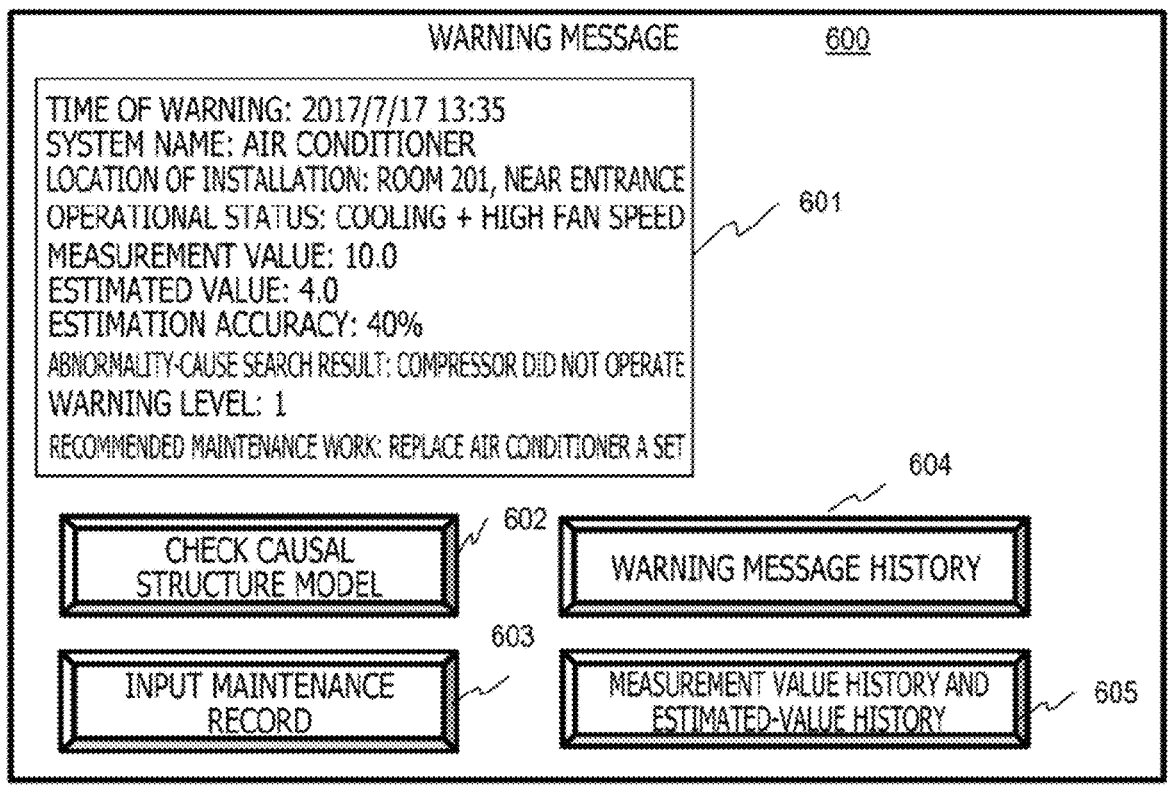

FIG.32

MAINTENANCE-RECORD INPUT IMAGE 620

| | |
|---|---|
| SYSTEM NAME/ID: | AIR CONDITIONER/100112 |
| LOCATION OF INSTALLATION: | ROOM 201, NEAR ENTRANCE |
| TIME OF OCCURRENCE OF ERROR: | 2017/7/17 13:35 |
| ERROR TYPE: | COMPRESSOR DID NOT OPERATE |
| OPERATIONAL STATUS: | COOLING + HIGH FAN SPEED |
| MAINTENANCE START TIME: | 2017/7/17 15:35 |
| MAINTENANCE END TIME: | 2017/7/17 17:35 |
| MAINTENANCE WORK TYPE: | REPLACE AIR CONDITIONER A SET |
| DETAILS OF MAINTENANCE: | WIRES OF AIR CONDITIONER ARE ALSO REPLACED |

# MONITORING SYSTEM AND MONITORING METHOD

INCORPORATION BY REFERENCE

The present application claims a priority to JP-2018-181281, which is a Japanese application filed on Sep. 27, 2018, the contents of which are incorporated by reference into the present application.

TECHNICAL FIELD

The present invention relates to a monitoring system and a monitoring method.

BACKGROUND ART

Business operation management systems of social infrastructures like trains, water and sewage, and urban transportation include a plurality of subsystems. For example, a train business operation management system includes more than one hundred subsystems. Such social infrastructures are demanded to achieve continuous business operation improvements. For example, if an attention is paid here to train maintenance, while there is a tendency of increase of maintenance costs along with the deterioration of facilities, the decrease of transportation-related revenue due to depopulation is anticipated. Accordingly, planning of measures for the improvement of business operation that reduce maintenance costs without impairing the safety of transportation has been demanded.

One of the best solutions for reduction of maintenance costs is predictive maintenance. The most important function of predictive maintenance is to estimate where a cause of an error will occur, what the type of the cause is, and what a possible solution for preventing an occurrence of a problem is.

For example, Patent Document 1 discloses one method of estimating causal relations of a system. On the other hand, Patent Document 2 discloses another solution for estimating causal relations between errors and logs being executed. In addition, Patent Document 3 discloses a technique of predicting potential problems by deep learning.

PRIOR ART DOCUMENT

Patent Documents

Patent Document 1: WO2010/082322
Patent Document 2: JP-2016-045556-A
Patent Document 3: JP-H9-269217-A

SUMMARY OF THE INVENTION

Problem to be Solved by the Invention

In order to cope with a system abnormality appropriately and promptly, it is important to estimate a cause of the system abnormality promptly with high accuracy. However, it is difficult with conventional statistical and machine learning techniques to trace the cause promptly and accurately.

Means for Solving the Problem

According to one aspect of the present invention, a monitoring system that monitors a monitoring-target system, the monitoring system including one or more storage apparatuses that store a program, and one or more processors that operate according to the program, in which the one or more processors determine an estimated value of a monitoring-target response variable of the monitoring-target system on a basis of measurement data included in test data of the monitoring-target system and a causal structure model of the monitoring-target system, and decide whether an abnormality has occurred in the monitoring-target system on a basis of a result of a comparison between a measurement value of the monitoring-target response variable included in the test data and the estimated value.

Advantages of the Invention

According to one aspect of the present invention, it becomes possible to estimate causes of system abnormalities promptly with high accuracy.

BRIEF DESCRIPTION OF THE DRAWINGS

FIG. 12 illustrates an example image to be displayed in a case in which a button is selected by the user on the monitoring image.

FIG. 31 illustrates an example warning message.

FIG. 32 illustrates a maintenance-record input image.

MODES FOR CARRYING OUT THE INVENTION

In the following, embodiments of the present invention are described with reference to the attached drawings. In the attached drawings, functionally the same elements are denoted by the same numbers. Note that, although the attached drawings illustrate specific embodiments according to the principle of the present invention, these are for understanding of the present invention and by no means used for interpreting the present invention in a limited manner.

Overview of Embodiments

Figure 1:
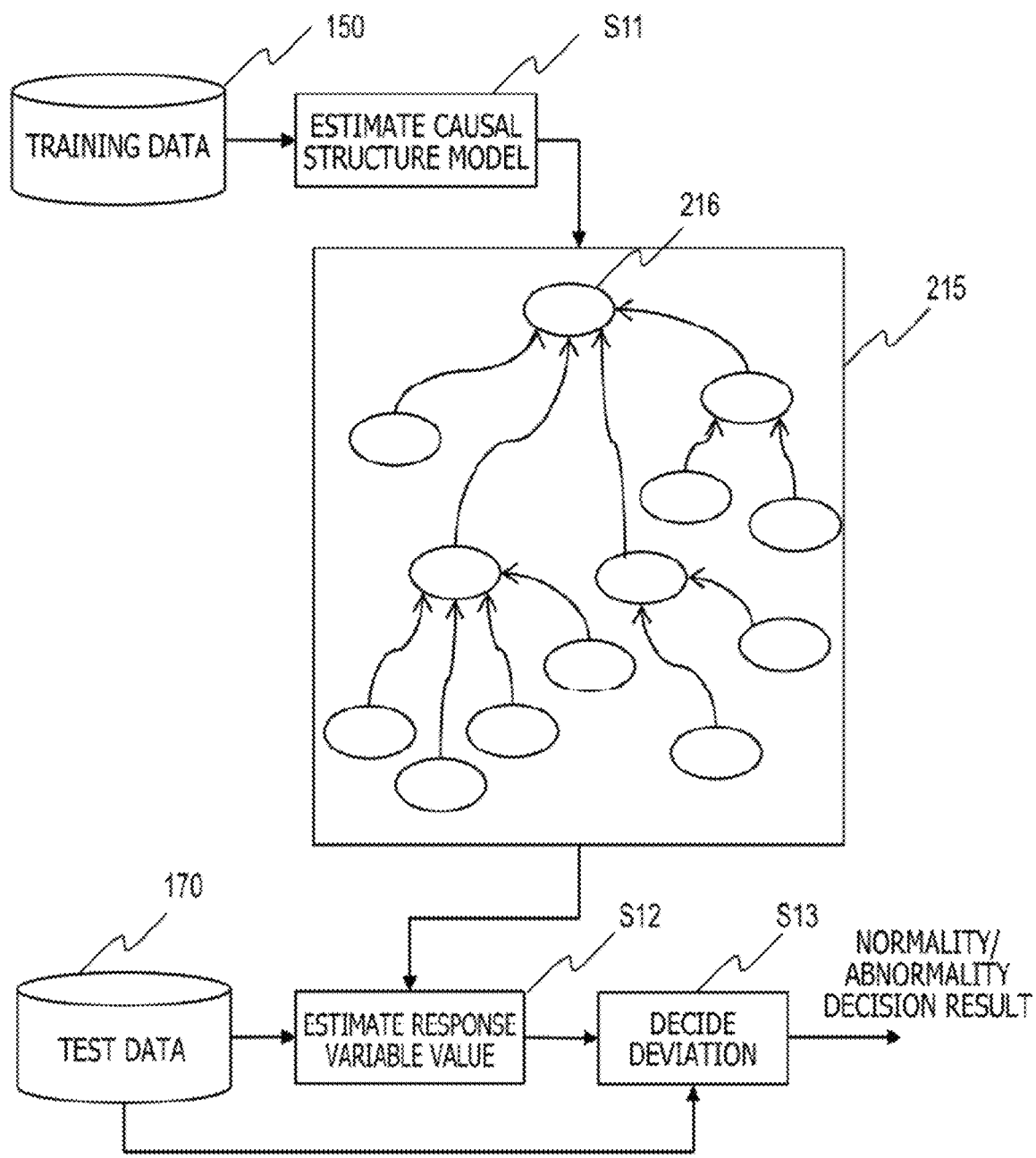
FIG. 1 schematically illustrates the overview of a process performed by a remote monitoring system of the present disclosure.

FIG. 1 schematically illustrates the overview of a process performed by a remote monitoring system of the present disclosure. The remote monitoring system estimates a causal structure model 215 from training data 150 (S11). The causal structure model 215 is a model having a directional graph structure indicating causal relations between pieces of data regarding a monitoring-target system. The causal structure model 215 can be represented by a causal loop diagram (Causal Loop Diagram: CLD). The causal structure model 215 is also called a CLD model.

In the causal structure model 215, the start-point node of an edge is a cause node (explanatory-variable node), and the end-point node of the edge is a result node (response-variable node). The result node represents a response variable, and the cause node represents an explanatory variable. A variable of the result node is represented by a regression formula of a variable of the cause node. Each term of the regression formula is a linear term (the first degree) or a non-linear term (higher than the first degree). In a case in which explanatory variables are $X1$, $X2$ and $X3$, a response variable $Y$ is represented by a formula such as $aX1*X2+bX1*X3+cX2*X3$ or $aX1+bX2+cX3^2$, for example, $a$, $b$, and $c$ are coefficients.

The causal structure model 215 has a hierarchical structure. A cause node (explanatory variable) of an upper-layer result node (response variable) is a result node (response variable) of a still lower-layer cause node (explanatory variable). In the causal structure model 215, a top node 216 that is reached by tracing nodes according to directional edges indicates a monitoring-target response variable.

The remote monitoring system inputs test data 170 of the monitoring-target system to the estimated (generated) causal structure model 215 and acquires an estimated value of the monitoring-target response variable (S12). For example, the test data 170 is real time data, and includes data indicating the current status and situation of the monitoring-target system. The remote monitoring system compares the estimated value of the monitoring-target response variable generated by the causal structure model 215 with a measurement value of the monitoring-target response variable included in the test data 170, and determines the degree of deviation therebetween. On the basis of the computed degree of deviation, the remote monitoring system decides whether an abnormality has occurred in the monitoring-target system (S13).

In a case in which it is decided that an abnormality has occurred in the monitoring-target system, a node which is deemed to be an abnormality cause is searched for in the causal structure model 215 to which the test data 170 has been input. The causal structure model 215 has a directional graph structure indicating relations between causes and results, and the remote monitoring system can estimate a potential abnormality cause efficiently with high accuracy. Note that, in a case in which the causal structure model 215 is prepared in advance, the estimation of the causal structure model may be omitted. By estimating the causal structure model from training data, it becomes unnecessary to prepare in advance an appropriate causal structure model.

[System Configuration]

Figure 2:
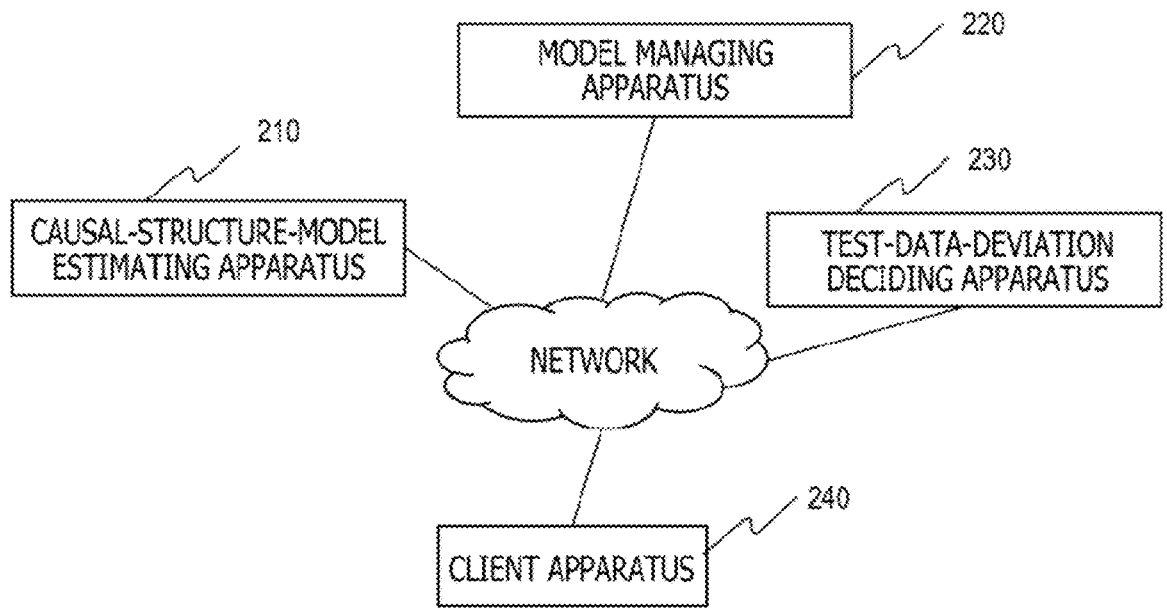
FIG. 2 illustrates a configuration example of the remote monitoring system.

FIG. 2 schematically illustrates a configuration example of the remote monitoring system. The remote monitoring system includes a causal-structure-model estimating apparatus 210, a model managing apparatus 220, a test-data-deviation deciding apparatus 230, and a client apparatus 240, and these communicate with each other via network. For example, the network is a local area network (LAN) or a wide area network (WAN).

Each of the causal-structure-model estimating apparatus 210, the model managing apparatus 220, the test-data-deviation deciding apparatus 230 and the client apparatus 240 can include one or more computers, for example. In addition, a plurality of apparatuses among them may be achieved by one computer.

Figure 3:
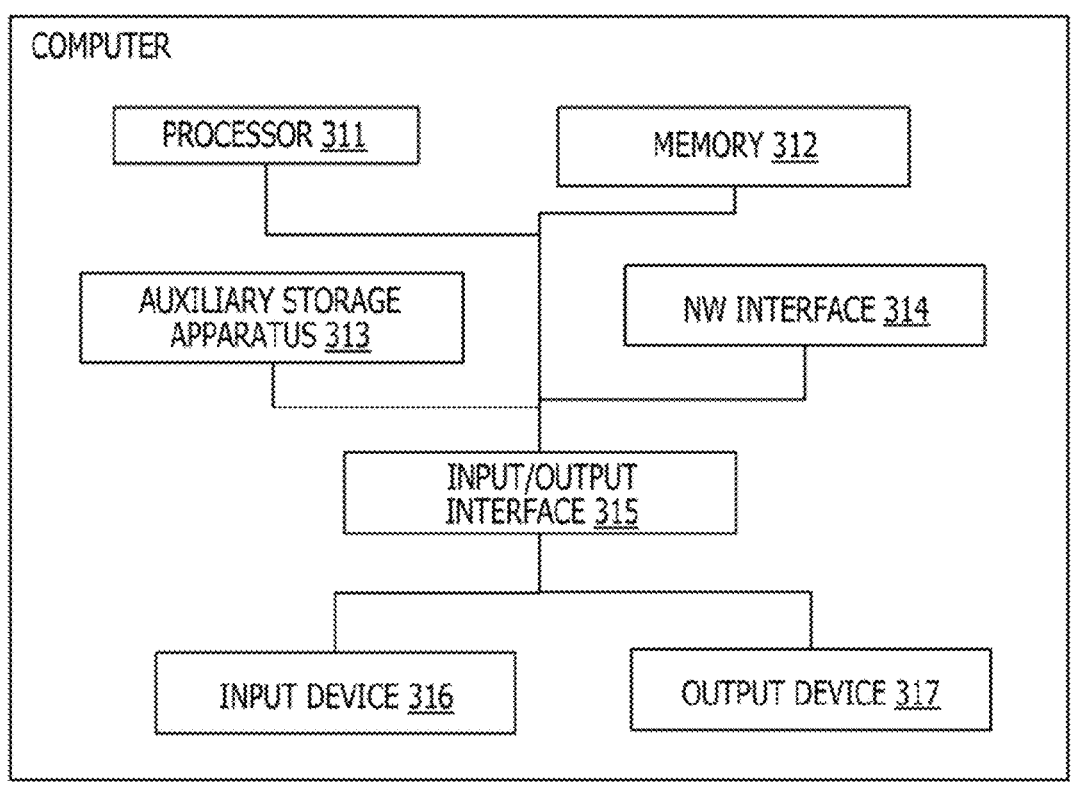
FIG. 3 schematically illustrates a hardware configuration example of a computer.

FIG. 3 schematically illustrates a hardware configuration example of a computer. The computer includes one or more storage apparatuses that store programs, and one or more processors that operate according to the programs. The computer includes a processor 311, a memory 312, an auxiliary storage apparatus 313, a network interface 314, an input/output interface 315, an input device 316, and an output device 317. These components are connected with each other by a bus. The memory 312, the auxiliary storage apparatus 313 or a combination of the memory 312 and the auxiliary storage apparatus 313 is a storage apparatus and includes a storage medium that stores software.

The memory 312 includes a semiconductor memory, for example, and is mainly used for retaining programs and data temporarily. The processor 311 executes various processes according to the programs stored in the memory 312. By the processor 311 operating according to the programs, various functional sections are achieved. The auxiliary storage apparatus 313 includes a high-capacity storage apparatus such as a hard disk drive or a solid state drive, for example, and is used for retaining programs and data for a long period.

At the time of activation or when necessary, the programs and data stored in the auxiliary storage apparatus 313 are loaded into the memory 312, and the processor 311 executes the programs. Thereby, various types of processes of the remote monitoring system are executed. Accordingly, processes executed by the programs below are processes performed by the processor 311 or an apparatus including the processor.

The network (NW) interface 314 is an interface for a connection with the network, and the computer communicates with other apparatuses via the network interface 314 and the network. The input device 316 and the output device 317 present information to a user, and also are used by the user to input necessary information. Examples of the input device 316 are a keyboard, a mouse, and a touch sensor, and examples of the output device are a display, a printer, and a speaker. The input device 316 and the output device 317 communicate with other components of the computer via the input/output interface 315.

For example, the auxiliary storage apparatus 313 may be omitted. The input/output interface 315, the input device 316, and the output device 317 may be omitted in some apparatuses. In a case in which functions of all the apparatuses are implemented in one computer, the network interface 314 may be omitted. At least some functionalities of each apparatus may be achieved by a logic circuit other than the processor.

Figure 4:
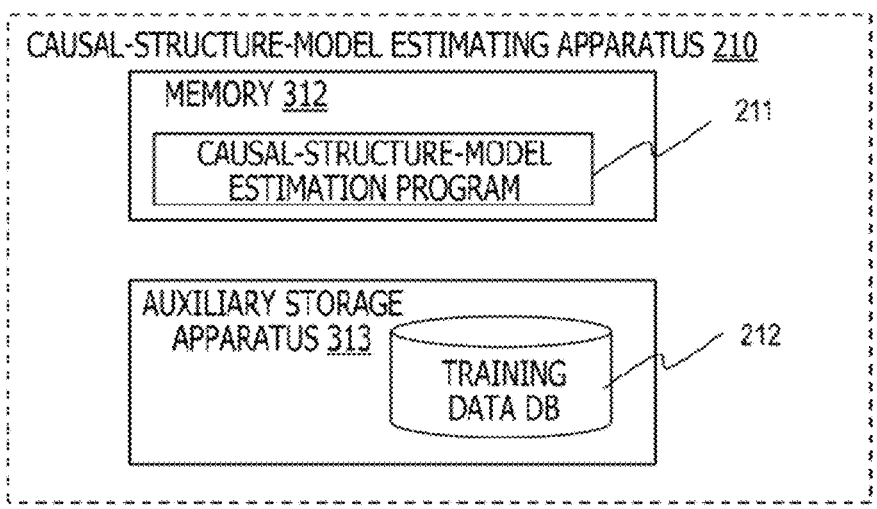
FIG. 4 illustrates a software configuration example of a causal-structure-model estimating apparatus.

FIG. 4 illustrates a software configuration example of the causal-structure-model estimating apparatus 210. The causal-structure-model estimating apparatus 210 stores a causal-structure-model estimation program 211 in the memory 312, and stores a training data database (DB) 212 in the auxiliary storage apparatus 313. The training data database 212 stores training data for estimating (generating) a causal structure model.

Figure 5:
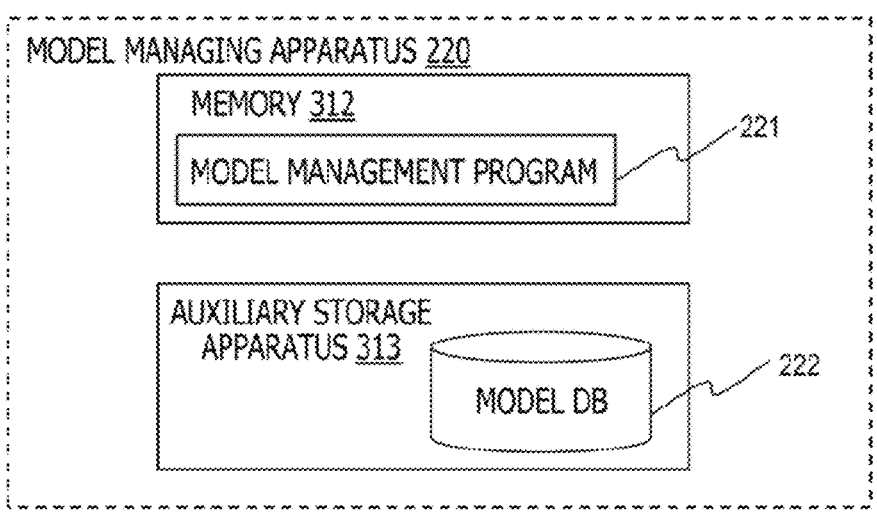
FIG. 5 illustrates a software configuration example of a model managing apparatus.

FIG. 5 illustrates a software configuration example of the model managing apparatus 220. The model managing apparatus 220 stores a model management program 221 in the memory 312 and stores a model database 222 in the auxiliary storage apparatus 313. The model database 222 stores causal structure models estimated by the causal-structure-model estimating apparatus 210. As mentioned below, the model database 222 stores causal structure models of a plurality of different operational statuses of the monitoring-target system.

Figure 6:
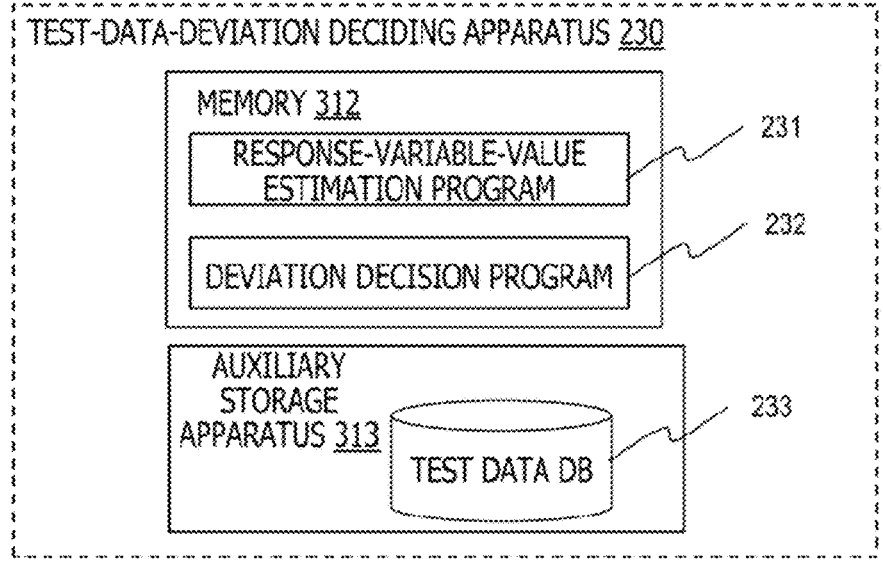
FIG. 6 illustrates a software configuration example of a test-data-deviation deciding apparatus.

FIG. 6 illustrates a software configuration example of the test-data-deviation deciding apparatus 230. The test-data-deviation deciding apparatus 230 stores a response-variable-value estimation program 231 and a deviation decision program 232 in the memory 312 and stores a test data database 233 in the auxiliary storage apparatus 313. The test data database 233 stores test data for abnormality decisions of the monitoring-target system.

As mentioned above, the processors 311 operate as functional sections according to the programs. For example, the processor 311 in the causal-structure-model estimating apparatus 210 functions as a causal-structure-model estimating section, and the processor 311 in the model managing apparatus 220 functions as a model managing section. In addition, the processor 311 in the test-data-deviation deciding apparatus 230 functions as a response-variable-value estimating section and a deviation deciding section.

Note that, although the programs are stored in the memories 312, and the databases are stored in the auxiliary storage apparatuses 313 for convenience in FIGS. 4, 5 and 6, typically, data (including the programs) of the computers are stored in the auxiliary storage apparatuses 313, and data to be processed by the processors 311 are loaded from the auxiliary storage apparatuses 313 into the memories 312. In addition, data updated on the memories 312 are stored in the auxiliary storage apparatuses 313. Note that a user interface program is executed on the client apparatus 240.

[Normality/Abnormality Decision Using Causal Structure Model]

Next, a process executed by the response-variable-value estimation program 231 of the test-data-deviation deciding apparatus 230 is described. The response-variable-value estimation program 231 estimates a monitoring-target response variable value from test data according to a causal structure model.

Figures 7, 8:
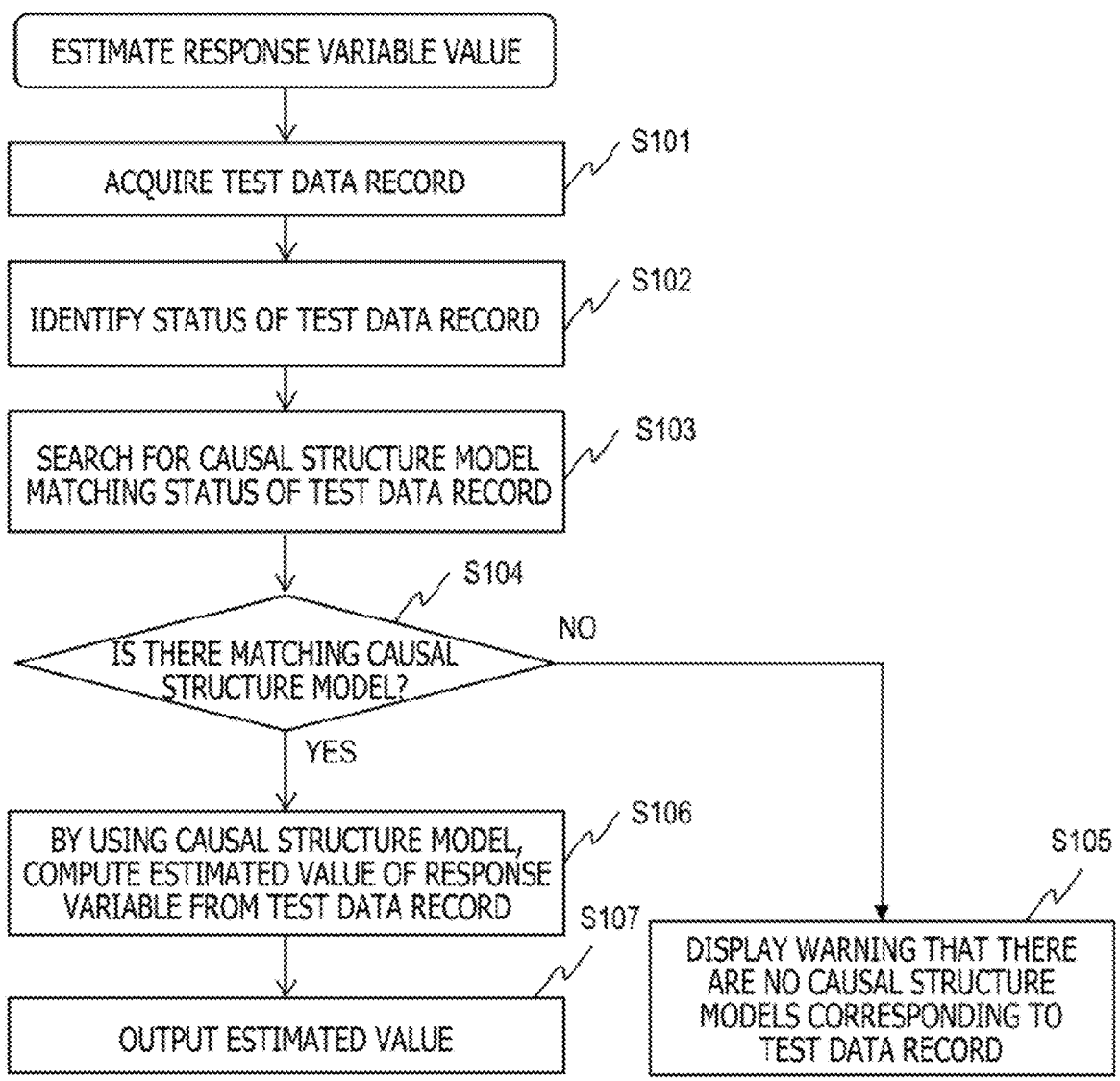
FIG. 7 illustrates a configuration example of a test data database.
FIG. 8 is a flowchart of a process performed by a response-variable-value estimation program.

FIG. 7 illustrates a configuration example of the test data database 233. FIG. 7 illustrates one test data record 171 in the test data database 233. The remote monitoring system keeps monitoring the monitoring-target system, and regularly adds test data records 171 to the test data database 233. The test data record 171 includes information of statuses of the monitoring-target system and values (measurement values) obtained from data measured by sensors.

The test data database 233 includes time fields 172, fields 173 indicating statuses (operational statuses) of the monitoring-target system, and fields 174 of measurement data. For example, it is supposed here that the monitoring-target system is an air conditioner. The time fields 172 indicate times at which data of test data records are acquired. In the example illustrated in FIG. 7, dates are omitted.

Each of the fields 173 indicating operational statuses indicates an item of the setting of the air conditioner. For example, the fields 173 indicating operational statuses include fields of ON/OFF of the power supply, fields of the operation mode such as cooling or heating, fields of the fan speed, fields of the vertical swing, and the like. The fields 174 of measurement data include, for example, fields of the room temperature of a room where the air conditioner is installed, fields of the temperature of air taken in by the air conditioner, fields of the temperature of air discharged from the air conditioner, and the like.

As mentioned below, fields of the training data database 212 include all the fields of the test data database 233. Each of nodes in a causal structure model indicates a value of measurement data regarding the monitoring-target system. The causal structure model 215 indicates causal relations between pieces of the measurement data regarding the monitoring-target system.

FIG. 8 is a flowchart of a process performed by the response-variable-value estimation program 231. The response-variable-value estimation program 231 computes an estimated value of a monitoring-target response variable from a test data record 171 according to the causal structure model 215. In the example of the air conditioner, the response variable, that is, the top node 216 in the causal structure model 215, is the room temperature of the room where the air conditioner is installed, for example.

The response-variable-value estimation program 231 acquires a test data record 171 from the test data database 233 (S101). The response-variable-value estimation program 231 starts this process, for example, when a new test data record 171 is added to the test data database 233. In that case, the response-variable-value estimation program 231 acquires the added test data record 171 from the test data database 233.

The response-variable-value estimation program 231 identifies an operational status of the test data record 171 (S102). Specifically, the response-variable-value estimation program 231 acquires values in fields 173 indicating an operational status in the test data record 171. The operational status of the monitoring-target system is represented by a set of values (vector) in the fields 173 indicating the operational status. A different value even in one field in the fields 173 indicating operational statuses represents a different operational status.

The response-variable-value estimation program 231 searches the model database 222 for a causal structure model matching the operational status of the test record (S103). Specifically, the response-variable-value estimation program 231 specifies the operational status and requests the model managing apparatus 220 to search for a causal structure model. The model management program 221 searches the model database 222 for a causal structure model of an operational status identical to the specified operational status. As mentioned below, the model database 222 stores causal structure models corresponding to a plurality of different operational statuses. By preparing a causal structure model corresponding to each operational status, more appropriate normality/abnormality decisions and abnormality cause estimations become possible.

In a case in which there are no causal structure models matching the specified operational status, the model management program 221 transmits a reply to that effect to the causal-structure-model estimating apparatus 210. In a case in which there is a causal structure model matching the specified operational status, the model management program 221 transmits the causal structure model to the causal-structure-model estimating apparatus 210.

In a case in which there are no causal structure models matching the test data record 171 (S104: NO), the response-variable-value estimation program 231 causes the client apparatus 240 to display a warning that there are no causal structure models corresponding to the test data record (S105). Specifically, the response-variable-value estimation program 231 transmits image data for the display to the client apparatus 240. The client apparatus 240 displays the image on its display device.

Note that a causal structure model matching the test data record 171 may not have an operational status vector that completely matches that of the test data record 171. For example, a causal structure model having a similarity of operational statuses higher than a predetermined value and having the highest similarity may be determined as a causal structure model matching the test data record. The method of computation of similarities may be any method, and cosine similarities can be used, for example.

In a case in which there is a causal structure model matching the test data record 171 (S104: YES), the response-variable-value estimation program 231 acquires the causal structure model and uses the causal structure model to compute an estimated value of the monitoring-target response variable from the test data record 171 (S106). By using a causal structure model matching the test data record 171, the value of the monitoring-target response variable can be estimated accurately.

Specifically, from the test data record 171, the response-variable-value estimation program 231 extracts values corresponding to the lowermost-layer nodes in the causal structure model 215. The value of each node in the causal structure model 215 is included in the test data record 171. According to the causal structure model 215, the response-variable-value estimation program 231 computes the value of the top node from the values of the lowermost-layer nodes. The value of the top node is the estimated value of the monitoring-target response variable.

The response-variable-value estimation program 231 outputs the computed estimated value to the memory 312 (S107). In addition, the response-variable-value estimation program 231 transmits the estimated value to the client apparatus 240. The client apparatus 240 displays the estimated value on its display device.

The response-variable-value estimation program 231 stores, as history information, the computed estimated value and information that identifies the test data record 171 and the causal structure model 215 used for the computation of the estimated value in the auxiliary storage apparatus 313. Respective pieces of information regarding the test data record 171 and the causal structure model 215 can be acquired from a test data database 233 and the model database 222 on the basis of the information identifying them.

Figure 9:
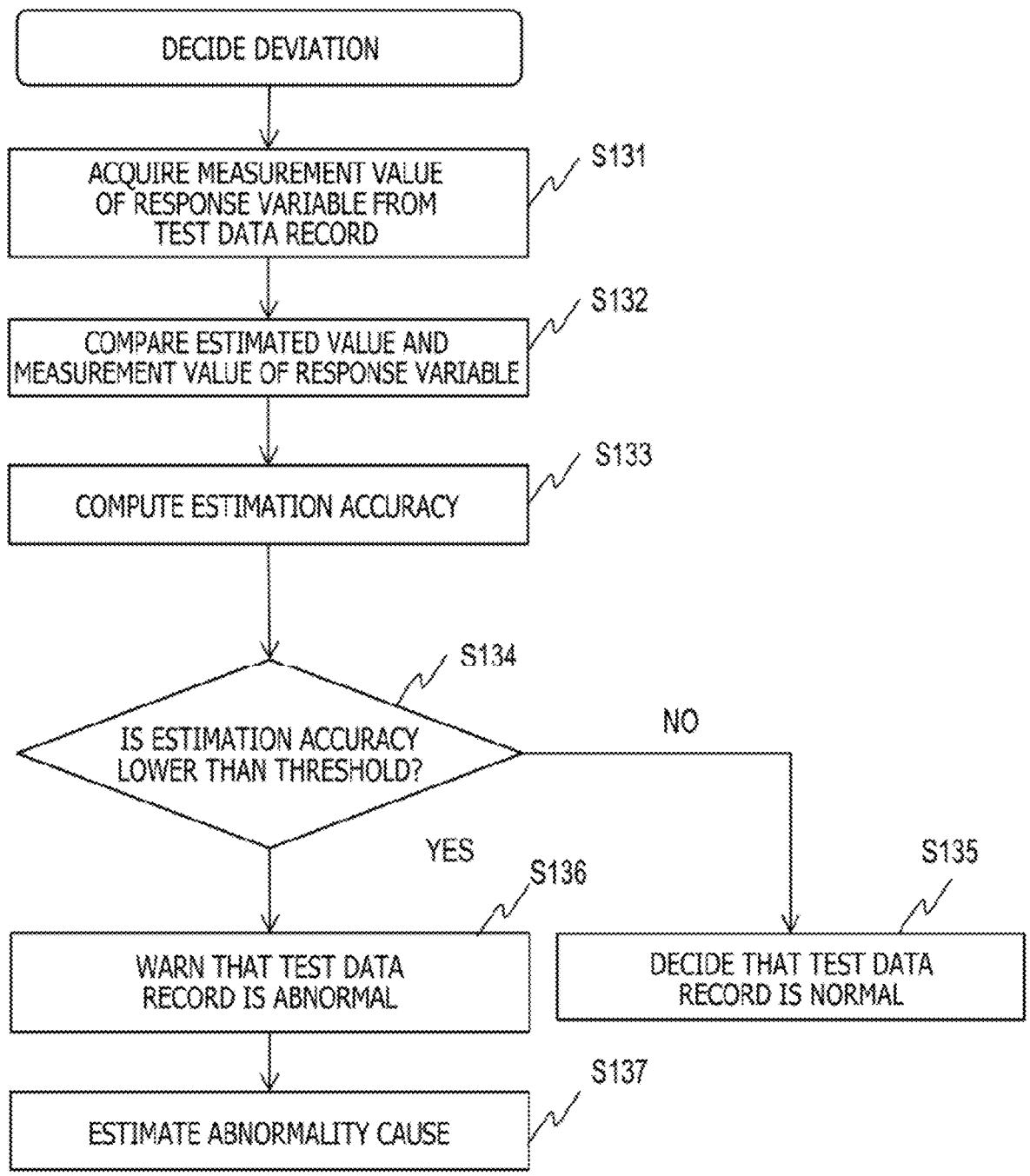
FIG. 9 is a flowchart of a process performed by a deviation decision program.

FIG. 9 is a flowchart of a process performed by the deviation decision program 232. The deviation decision program 232 computes a degree of deviation between the estimated value of the response variable computed by the response-variable-value estimation program 231 and a measurement value of the response variable included in the test data record 171, and estimates whether or not there is an abnormality in the monitoring-target system on the basis of the degree of deviation. In the example of the air conditioner, for example, the deviation decision program 232 computes a degree of deviation between an estimated value of the room temperature and a measurement value of the room temperature.

With reference to FIG. 9, the deviation decision program 232 acquires the measurement value of the response variable from the test data record 171 (S131). The deviation decision program 232 compares the measurement value with the estimated value of the response variable computed by the response-variable-value estimation program 231 (S132) and computes the estimation accuracy (S133). The estimation accuracy is an example of a degree of deviation, and for example, is computed by (1−|measurement value−estimated value|/measurement value).

The deviation decision program 232 compares the computed estimation accuracy with a predetermined threshold (S134). In a case in which the estimation accuracy is equal to or higher than the threshold (S134: NO), the deviation decision programs 232 decides that the test data record 171 (monitoring-target system) is normal and there are no abnormalities (S135).

In a case in which the estimation accuracy is lower than the threshold (S134: YES), the deviation decision program 232 decides that there is an abnormality in the test data record 171 (monitoring-target system) and warns that the test data record is abnormal (S136). Specifically, the deviation decision program 232 transmits, to a client apparatus 240, a warning that there is an abnormality in the monitoring-target system. The client apparatus 240 displays the warning on its display device.

The deviation decision program 232 stores, as history information, the computed estimation accuracy, the normality/abnormality decision result, and information identifying the test data record 171 in the auxiliary storage apparatus 313. The test data record 171 can be acquired from the test data database 233 by using the information identifying the test data record 171.

In a case in which it is decided that there is an abnormality in the test data record 171, the deviation decision program 232 estimates (searches for) an abnormality cause in the causal structure model 215 (S137). Details of the abnormality cause estimation are mentioned below.

As mentioned above, the test-data-deviation deciding apparatus 230 inputs measurement values of the test data record to the lowermost-layer nodes in the causal structure model 215, and sequentially computes estimated values of nodes in a plurality of upper layers (intermediate nodes) in the causal structure model 215. On the basis of a deviation between a value of the top node obtained in the end (the value of the response variable) and a measurement value in the test data record, the test-data-deviation deciding apparatus 230 decides whether an abnormality has occurred.

By estimating values of nodes hierarchically in a causal structure model having a hierarchical structure, abnormalities can be found promptly. Specifically, in a hierarchical estimation in the causal structure model 215, an abnormality at any of the nodes is propagated to upper layers. Accordingly, by performing computations of estimated values over a plurality of layers in the causal structure model 215, abnormalities of the estimated values (deviations from measurement values) are amplified. Thereby, an abnormality in the monitoring-target system can be detected earlier.

Note that values of the test data record may be input to nodes which are not the lowermost-layer nodes in the causal structure model 215. In a case in which there are one or more intermediate nodes between the monitoring-target response-variable node and nodes to which test data is input, early detection of an abnormality becomes possible. A monitoring-target response-variable node may be an intermediate node in a causal structure model stored in the model database 222. That is, there may be edges that extend from the monitoring-target response-variable node to upper-layer nodes. In a computation of an estimated value, the monitoring-target response-variable node is treated as a top node.

Figure 10:
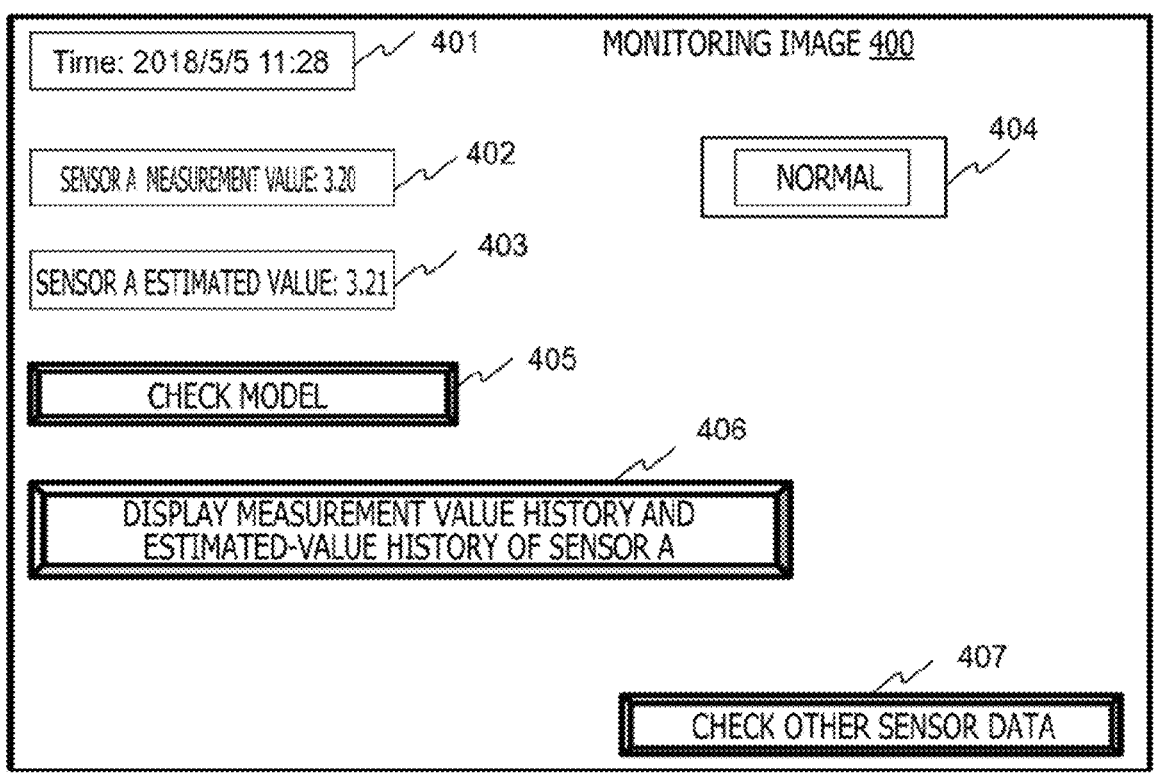
FIG. 10 illustrates an example of a monitoring image of a monitoring target.
Figure 11:
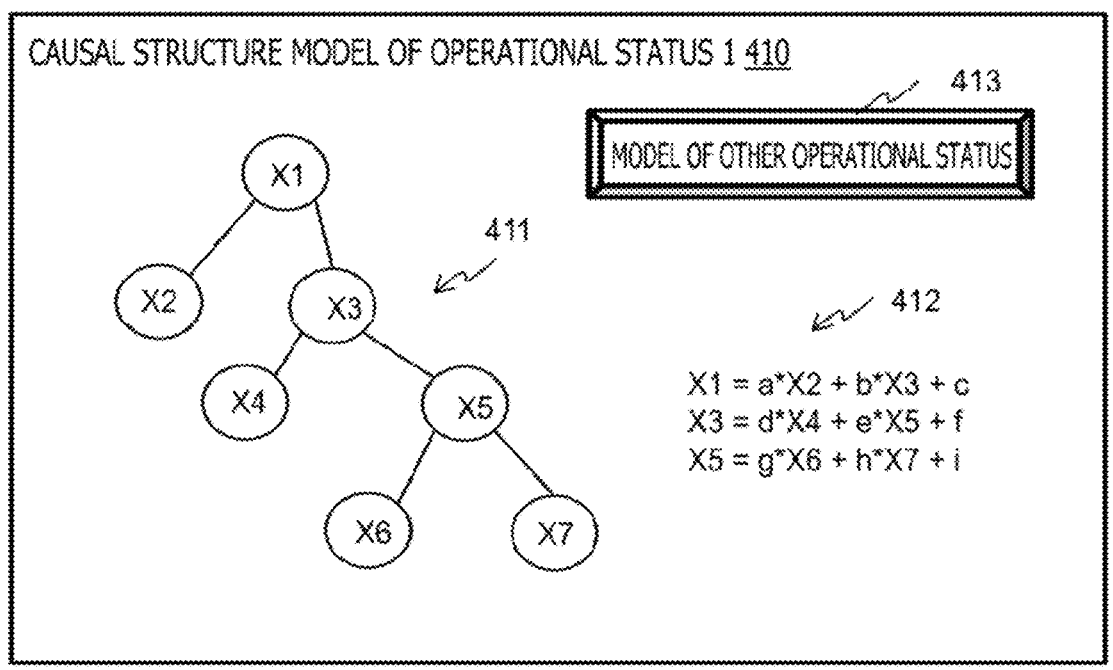
FIG. 11 illustrates an example image to be displayed in a case in which a model check button is selected by a user on the monitoring image.

FIGS. 10, 11 and 12 illustrate examples of graphical user interface (GUI) images to be displayed by the client apparatus 240. FIG. 10 illustrates an example of a monitoring image 400 of a monitoring target. The monitoring image 400 illustrates test results of a test data record 171. Specifically, the monitoring image 400 includes an acquisition time 401 of the test data record, a measurement value 402 of a monitoring-target response variable, an estimated value 403 of the response variable, and a normality/abnormality decision result 404. In the present example, the value of the response variable is measured by a sensor A. The decision result 404 is notified from the deviation decision program 232, and other information is transmitted from the response-variable-value estimation program 231.

The monitoring image 400 further includes a model check button 405, a button 406 for displaying a measurement value history and an estimated-value history, and a button 407 for displaying information of other sensor data (response variables). With the monitoring image 400, a user can know monitoring information including normality/abnormality information of the monitoring target.

FIG. 11 illustrates an example image 410 to be displayed in a case in which the model check button 405 is selected by a user on the monitoring image 400. If the model check button 405 is selected, a causal structure model used for a computation of the estimated value of the response variable is displayed. In response to a request from the client apparatus 240, the causal-structure-model estimating apparatus 210 (e.g. response-variable-value estimation program 231) transmits information of the causal structure model used for the computation of the estimated value to the client apparatus 240.

In the image 410, the causal structure model is a causal structure model of an operational status 1. The image 410 includes a graph image 411 of the causal structure model, and regression formulae 412 indicating relations between nodes. The button 413 enables the display of models of other operational statuses. With the image 410, a user can check the causal structure model.

FIG. 12 illustrates an example image 420 to be displayed in a case in which the button 406 is selected by the user on the monitoring image 400. The image 420 indicates a measurement value history, an estimated-value history, and an estimation-accuracy history of the monitoring-target response variable. These pieces of information are acquired from the test-data-deviation deciding apparatus 230. The image 420 includes a table 421 indicating the measurement value history, the estimated-value history, and the estimation-accuracy history, a graph 422 indicating the measurement value history (temporal changes), and a graph 423 indicating the estimated-value history (temporal changes). With the image 420, the user can check the measurement value history, the estimated-value history, and the estimation-accuracy history.

Figure 13:
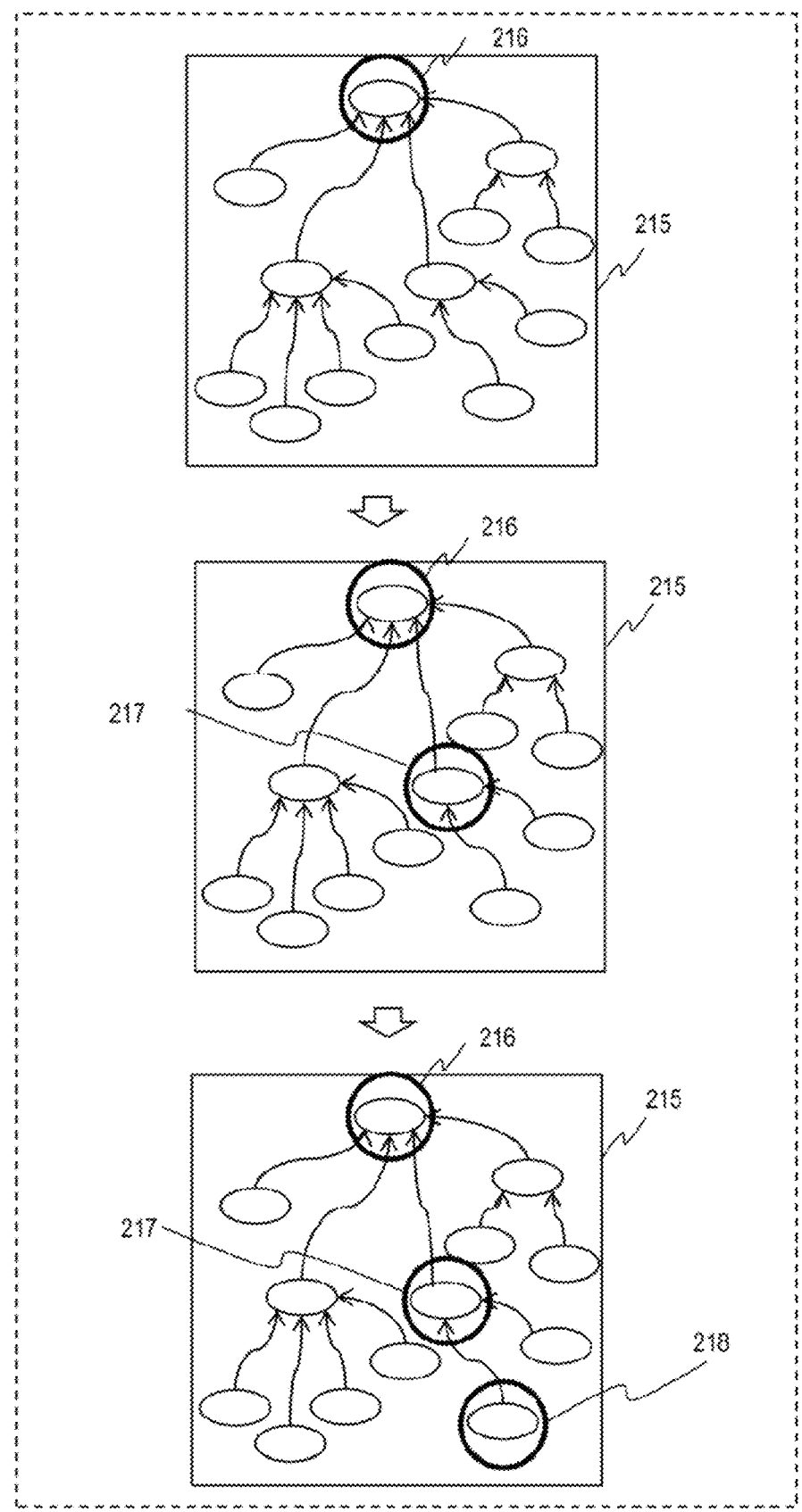
FIG. 13 schematically illustrates an example of an abnormality-cause-node estimation method.

Next, a process (S137) of estimating an abnormality cause in the causal structure model 215 is described. FIG. 13 schematically illustrates an example of an abnormality-cause-node estimation method. In the present example, an abnormality cause node is searched for from the monitoring-target response-variable node 216 toward lower layers along edges.

Specifically, the deviation decision program 232 computes a rate of change (an example of a deviation) from the last measurement of a measurement value (in an identical operational status) of each of cause nodes which are nodes immediately below the top node 216. The deviation decision program 232 determines, as an abnormality-cause-node candidate, a node which is included in the cause nodes of the top node 216 and whose rate of change from the last measurement exceeds a threshold. In the example illustrated in FIG. 13, a node 217 is the abnormality-cause-node candidate.

The deviation decision program 232 computes a rate of change between measurement values of each of cause nodes of the abnormality-cause-node candidate. The deviation decision program 232 determines a node with a rate of change exceeding a threshold as an abnormality-cause-node candidate. In the example illustrated in FIG. 13, a node 218 is the abnormality-cause-node candidate.

The deviation decision program 232 repeats the process described above until a layer (the lowermost layer in the present example) to which the test data has been input in the computation of the estimated value. In a case in which rates of change of all the cause nodes in intermediate layers are equal to or lower than the threshold, the search for a new abnormality-cause-node candidate is ended. The deviation decision program 232 presents all the discovered abnormality-cause-node candidates to a user.

The deviation decision program 232 may select, from abnormality-cause-node candidates, a node whose immediately underlying node is not an abnormality cause node and may present the selected node as an abnormality-cause-node candidate to the user. The deviation decision program 232 may select a node with the highest rate of change and may present the selected node as an abnormality-cause-node candidate to the user.

Figure 14:
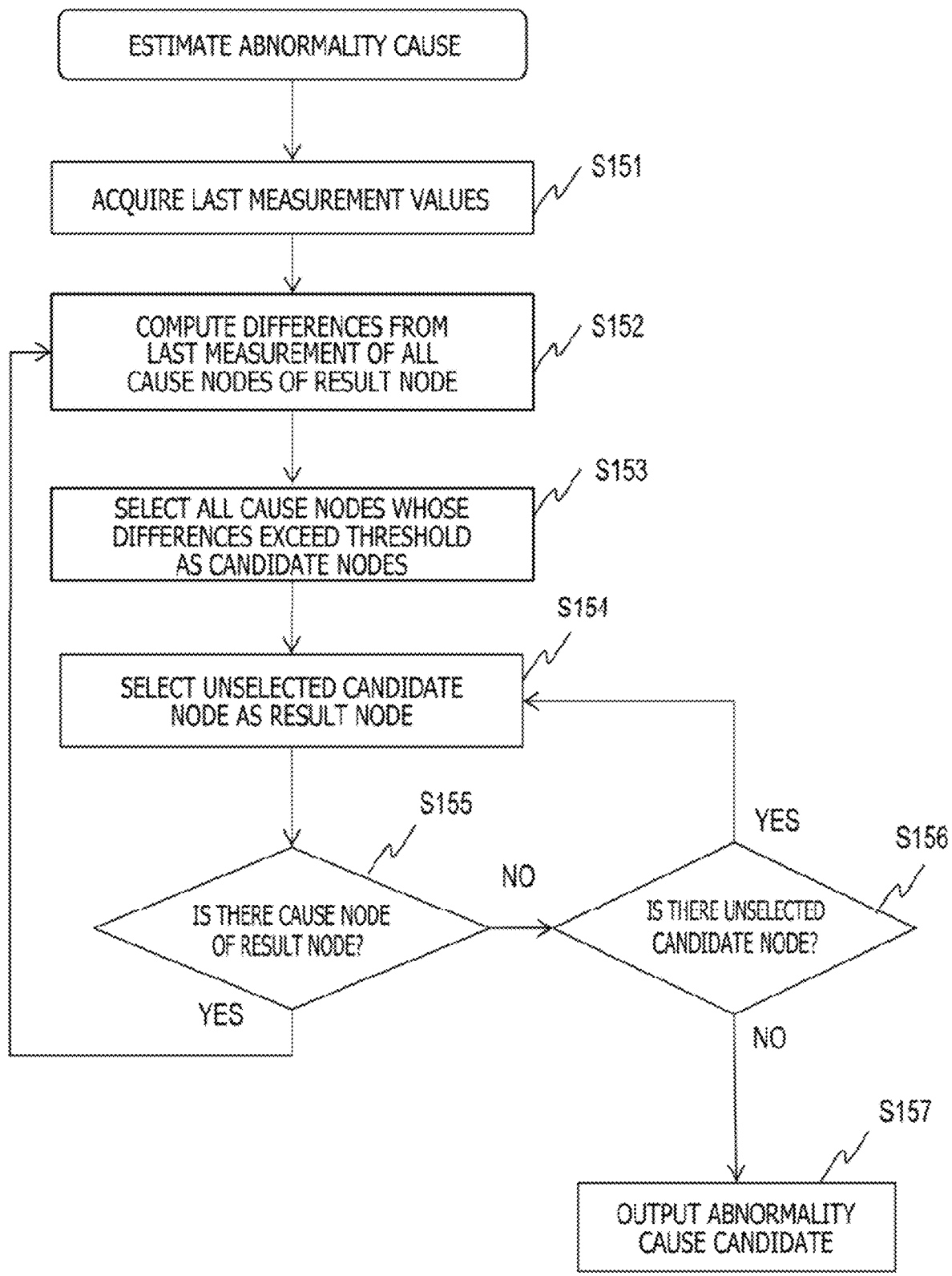
FIG. 14 is a flowchart of the abnormality-cause-node estimation method.

FIG. 14 is a flowchart of the abnormality-cause-node estimation method described with reference to FIG. 13. The deviation decision program 232 acquires the last test data record (measurement values) of the causal structure model 215 from the test data database 233 (S151). The deviation decision program 232 compares the measurement values in the last test data record with the measurement values in the current test data record, and computes rates of change between measurement values of all the cause nodes of a result node (S152). The result node to be selected first is the monitoring-target response-variable node 216.

The deviation decision program 232 selects all the cause nodes with rates of change exceeding a threshold as abnormality-cause-node candidates (S153). A common threshold is set for nodes, or a threshold is set for each node. The deviation decision program 232 selects an unselected abnormality-cause-node candidate as a result node (S154) and decides whether there is a cause node of the selected result node (S155).

In a case in which there is a cause node (S155: YES), the deviation decision program 232 executes Steps 152 and 153 for the selected result node. In a case in which there are no cause nodes (S155: NO), the deviation decision program 232 decides whether there is an unselected abnormality cause candidate node (S156).

In a case in which there is an unselected abnormality cause candidate node (S156: YES), the deviation decision program 232 newly selects the unselected abnormality cause candidate node (S154). In a case in which there are no unselected abnormality cause candidate nodes (S156: NO), the deviation decision program 232 outputs abnormality cause candidate nodes having been selected up to this point (S157). For example, the deviation decision program 232 transmits information of the abnormality cause candidate nodes to the client apparatus 240, and the client apparatus 240 displays the information.

Figure 15:
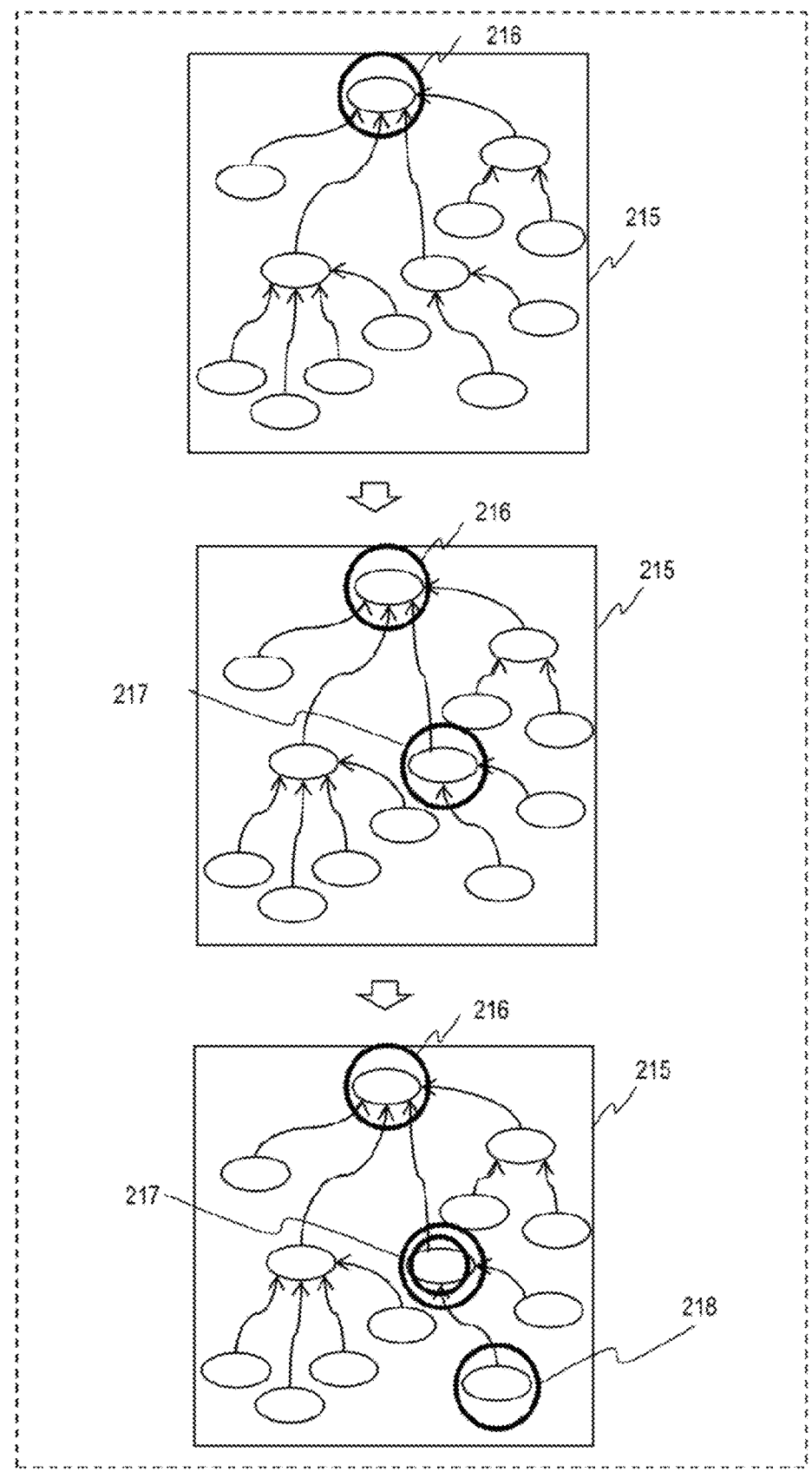
FIG. 15 schematically illustrates an example of an abnormality-cause-node estimation method.

Another example of the method of estimating abnormality cause nodes is described. FIG. 15 schematically illustrates an example of an abnormality-cause-node estimation method. In the present example, an abnormality cause node is searched for from the monitoring-target response-variable node 216 toward lower layers along edges. The deviation decision program 232 determines, as an abnormality-cause-node candidate, a node which is included in the cause nodes of the node 216 and whose rate of change (an example of a deviation) from the last measurement is the highest. In the example illustrated in FIG. 15, the node 217 is the abnormality-cause-node candidate.

The deviation decision program 232 computes a rate of change between measurement values of each of cause nodes of the abnormality-cause-node candidate 217. The deviation decision program 232 determines a node with the highest rate of change as an abnormality-cause-node candidate. In the example illustrated in FIG. 15, the node 218 is the abnormality-cause-node candidate.

The deviation decision program 232 repeats the process described above until a layer (the lowermost layer in the present example) to which the test data has been input in the computation of the estimated value. The deviation decision program 232 selects, as the most likely abnormality-cause-node candidate, a node with the highest rate of change of all the found abnormality-cause-node candidates. The deviation decision program 232 presents the selected abnormality-cause-node candidate to the user. In the example illustrated in FIG. 15, the node 217 is the most likely abnormality-cause-node candidate. Note that the deviation decision program 232 may present all the abnormality-cause-node candidates to the user.

Figure 16:
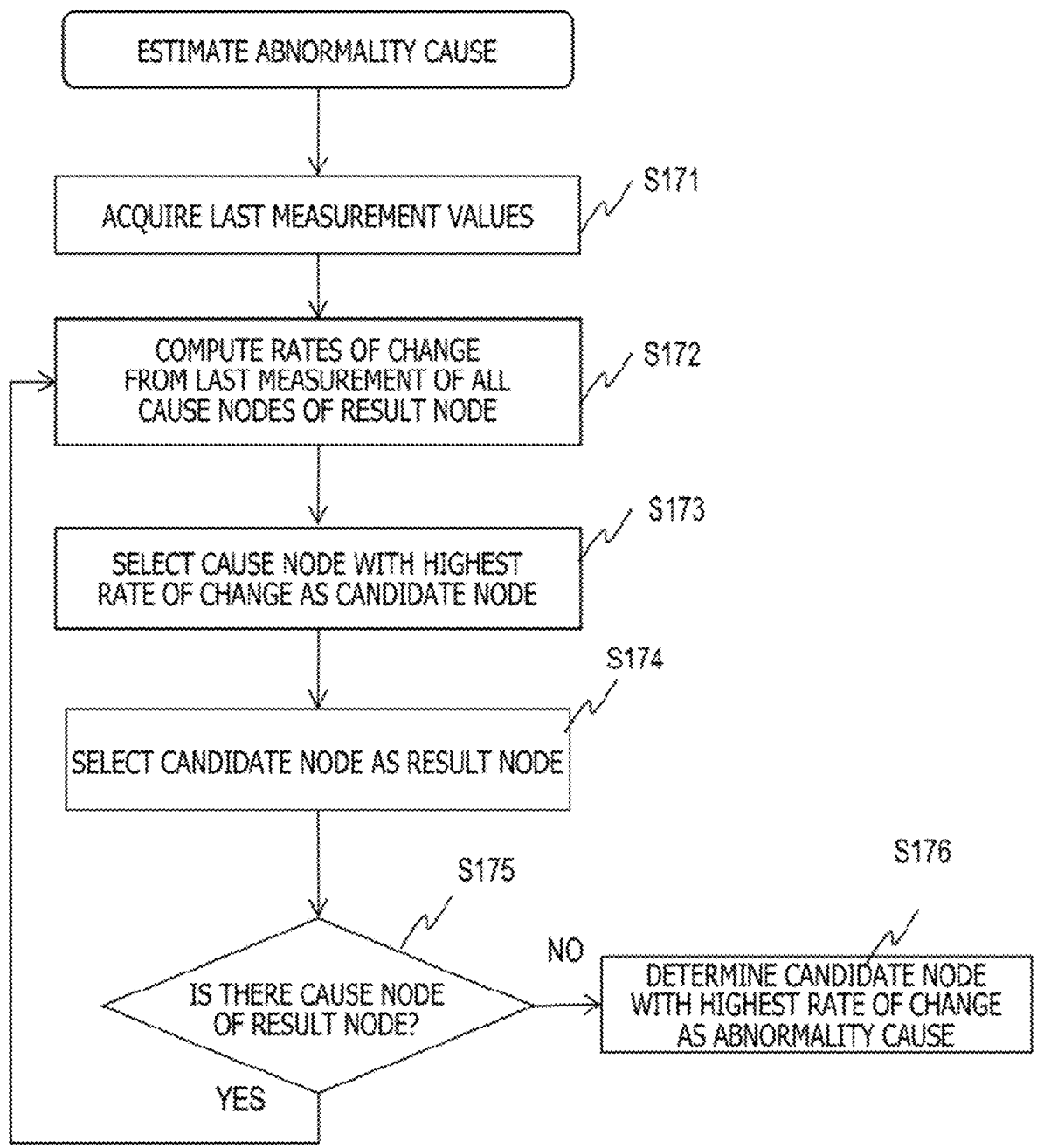
FIG. 16 is a flowchart of the abnormality-cause-node estimation method.

FIG. 16 is a flowchart of the abnormality-cause-node estimation method described with reference to FIG. 15. The deviation decision program 232 acquires the last test data record (measurement values) of the causal structure model 215 from the test data database 233 (S171). The deviation decision program 232 compares the measurement values in the last test data record with the measurement values in the current test data record and then computes rates of change between measurement values of all the cause nodes of a result node (S172). The result node to be selected first is the monitoring-target response-variable node 216.

The deviation decision program 232 selects a cause node with the highest rate of change as an abnormality-cause-node candidate (S173). The deviation decision program 232 selects the abnormality-cause-node candidate as a result node (S174) and decides whether there is a cause node (immediately underlying node) of the selected result node (S175). In a case in which there is a cause node (S175: YES), the deviation decision program 232 returns to Step S172.

In a case in which there are no cause nodes (S175: NO), the deviation decision program 232 determines, as the most likely abnormality-cause-node candidate, the node with the highest rate of change of the abnormality-cause-node candidates (S176). Furthermore, for example, the deviation decision program 232 transmits information of the most likely abnormality cause candidate node to the client apparatus 240, and the client apparatus 240 displays the information.

As mentioned above, by searching for abnormality-cause-node candidates from the monitoring-target response-variable node along edges in a causal structure model, abnormality-cause-node candidates can be identified promptly and appropriately.

In the method described with reference to FIGS. 13 and 14, instead of rates of change between previous values and current values, rates of change between the average value (moving average value) of a plurality of previous measurement values and current values may be used for determinations of abnormality-cause-node candidates. In another example, instead of rates of change between measurement values, estimation accuracy (deviation) between measurement values and estimated values may be used. The deviation decision program 232 computes the estimation accuracy of each node and determines, as an abnormality-cause-node candidate, nodes with estimation accuracy lower than a threshold. Because estimated values of lowermost-layer nodes are not computed, rates of change of measurement values are used.

In the method described with reference to FIGS. 15 and 16, instead of rates of change from previous values to current values, rates of change from the average value (moving average value) of a plurality of previous measurement values to current values may be used for determinations of abnormality-cause-node candidates. In another example, instead of rates of change between measurement values, estimation accuracy (degree of deviation) between measurement values and estimated values may be used. Because estimated values of lowermost-layer nodes are not computed, rates of change of measurement values are used. For comparison between the lowermost-layer nodes and intermediate-layer nodes, the rates of change between the measurement values of the lowermost-layer nodes are corrected.

[Estimation of Causal Structure Model]

Next, a process of an estimation (generation) of a causal structure model by the causal-structure-model estimating apparatus 210 is described. The causal-structure-model estimation program 211 analyzes training data stored in the training data database 212, and estimates (generates) a causal structure model. The causal-structure-model estimation program 211 may estimate a causal structure model by a freely selected method. In the following, one example of the method is described.

Figure 17:
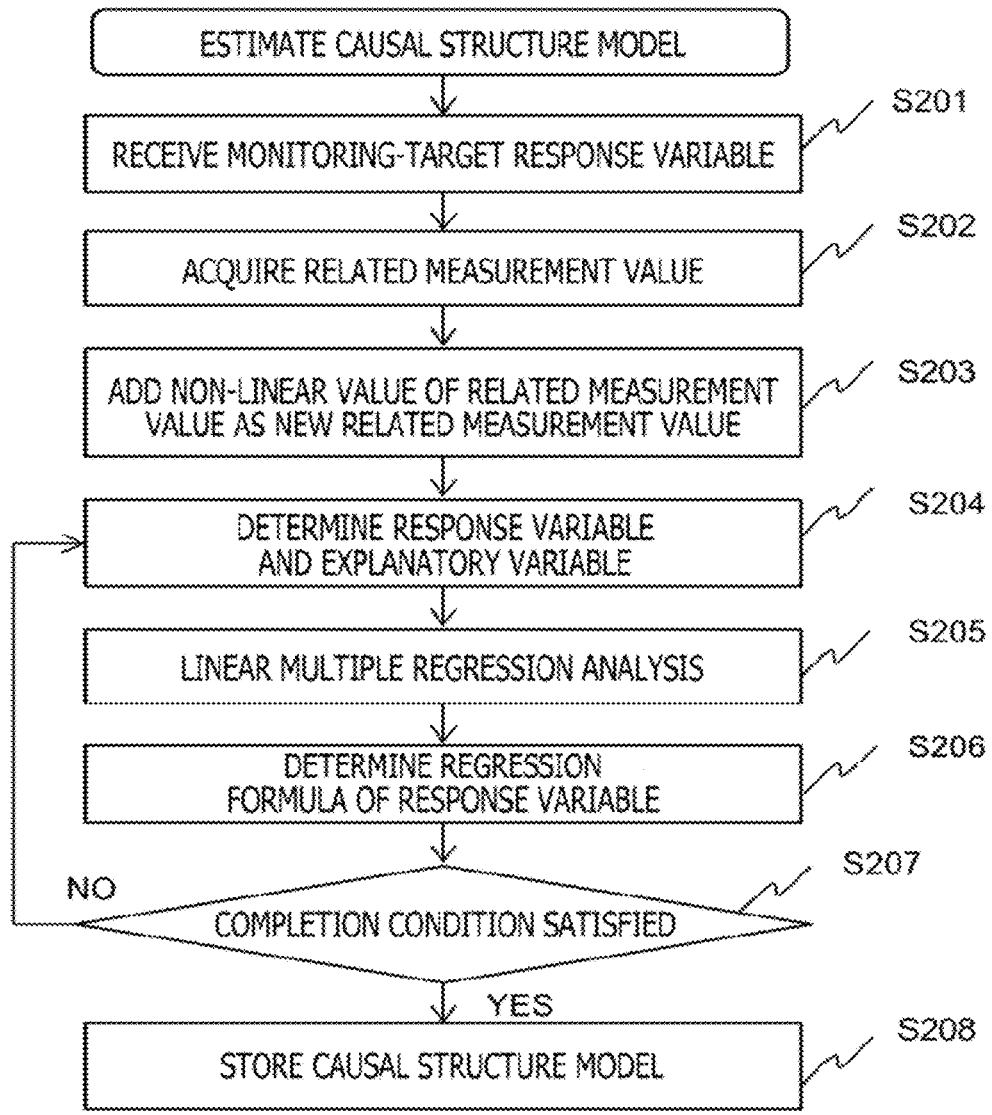
FIG. 17 is a flowchart of an estimation of a causal structure model by a causal-structure-model estimation program.

FIG. 17 is a flowchart of an estimation of a causal structure model by the causal-structure-model estimation program 211. The causal-structure-model estimation program 211 receives, from a user and via the client apparatus 240, an input that specifies a monitoring-target response variable (e.g. the room temperature) in a plurality of measurement values (measurement data) included in training data (S201).

From the training data, the causal-structure-model estimation program 211 extracts measurement values related to the specified monitoring-target response variable according to a predetermined algorithm (S202). The causal-structure-model estimation program 211 computes non-linear values from the related measurement values, and adds the non-linear values as new related measurement values (S203). The non-linear values are, for example, the squares of the measurement values or the products of the measurement values which are different from each other.

The causal-structure-model estimation program 211 selects an explanatory-variable candidate from the related measurement values (S205). For example, the causal-structure-model estimation program 211 performs single regression analysis between the related measurement values, and groups the related measurement values such that related values with correlation coefficients higher than a predetermined value form the same group. Furthermore, one related measurement value is selected freely from each group and is determined as an explanatory-variable candidate.

The causal-structure-model estimation program 211 executes multiple regression analysis (e.g. a forward-backward stepwise selection method) related to explanatory-variable candidates (S206) and calculates a regression formula of the response variable. As a result of this linear multiple regression analysis, the regression formula of the response variable is represented by a linear formula of explanatory variables. The causal-structure-model estimation program 211 may form the regression formula with non-linear terms.

Next, the causal-structure-model estimation program 211 decides whether the regression formula satisfies a preset completion condition (S207). The completion condition is, for example, that a related measurement value preset by the user is extracted as an explanatory variable or that a new node is not generated by the training data being used. In a case in which the completion condition is not satisfied (S207: NO), the causal-structure-model estimation program 211 determines each of the explanatory variables as a new response variable, and selects explanatory-variable candidates from unselected pieces of related data (S204).

The causal-structure-model estimation program 211 determines a regression formula for each of the response variables by linear multiple regression analysis of the explanatory-variable candidates. By sequentially repeating multiple regression analysis, the entire causal structure model related to Key Performance Indicators (KPI) data is estimated automatically.

In a case in which the completion condition is satisfied (S207: YES), the causal-structure-model estimation programs 211 transmits the created causal structure model to the model managing apparatus 220 and stores the causal structure model in the model database 222.

[Setting of Learning Period]

Figure 18:
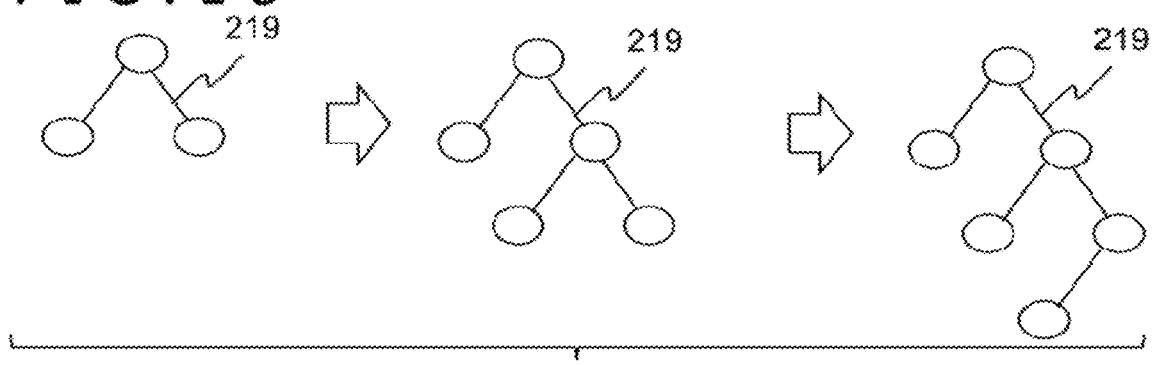
FIG. 18 illustrates the state where the number of nodes in the causal structure model being estimated increases along with the progression of learning.

Next, a method of determining a period of training data to be used for estimating a causal structure model is described. If the learning period is short, the number of data points that can be obtained is accordingly small, and accordingly, events that occur rarely cannot be captured. In addition, it is difficult to identify in advance a period in which all the events occur. Accordingly, it is important to use training data of an appropriate period. As illustrated in FIG. 18, along with the progression of the learning, the number of nodes in a causal structure model 219 being estimated increases (grows). In the example described below, the degree of growth of causal relations is measured, and a period with which a predetermined increment of growth is no longer observed is determined as an appropriate learning period.

Figure 19:
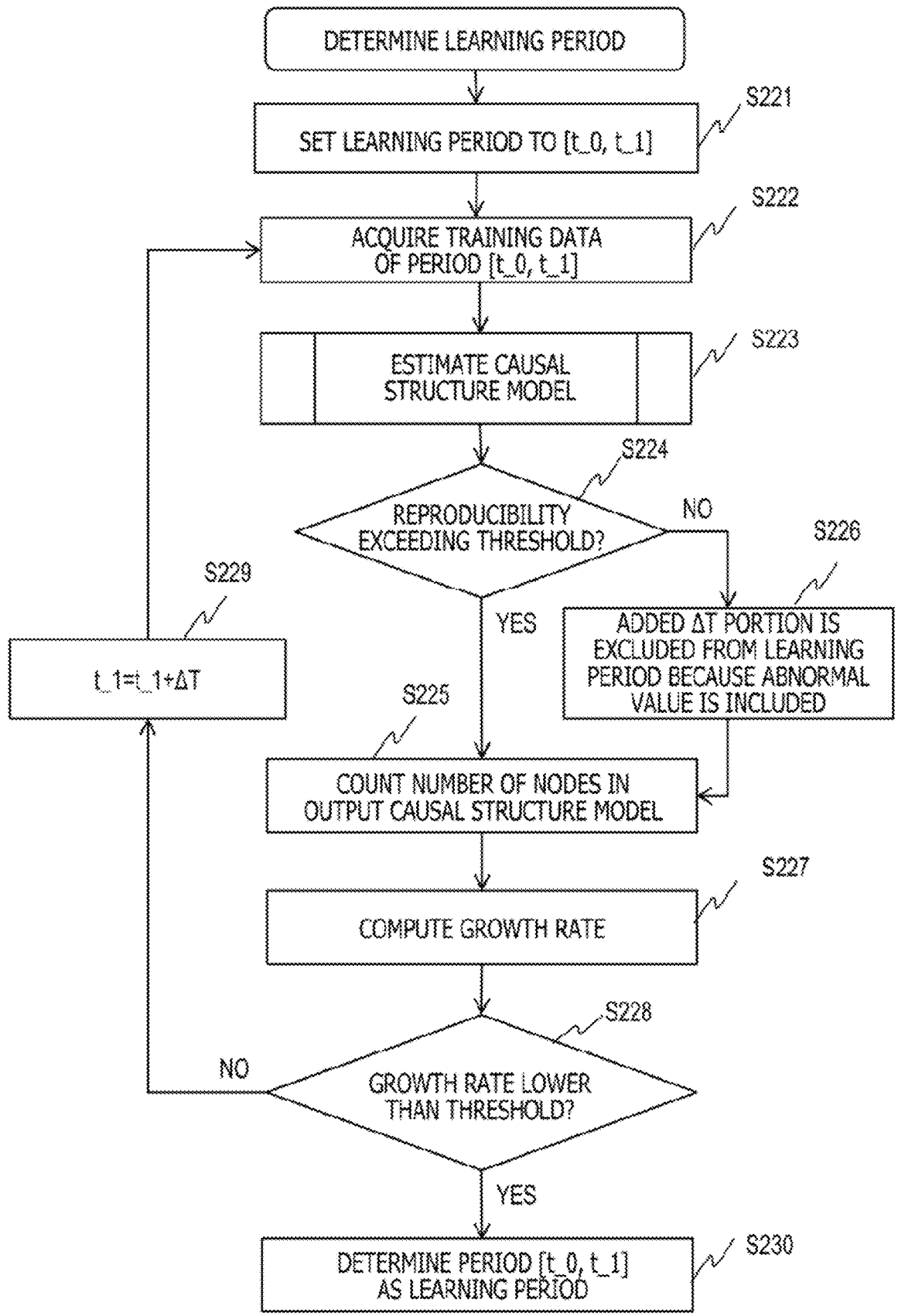
FIG. 19 illustrates a flowchart of a process of a determination of a learning period by the causal-structure-model estimation program.

In the example described below, a learning period with which the growth rate of a causal structure model of a similar system becomes lower than a threshold is determined as a learning period of the target system. The similar system is selected by a user. FIG. 19 illustrates a flowchart of a process of a determination of a learning period by the causal-structure-model estimation program 211.

The causal-structure-model estimation program 211 sets a learning period for a causal structure model of the similar system to [t_0, t_1] (S221). The causal-structure-model estimation program 211 acquires training data of the period [t_0, t_1] from the training data database 212 (S222). The causal-structure-model estimation program 211 estimates the causal structure model by using the training data (S223). The estimation of the causal structure model is as mentioned above.

The causal-structure-model estimation program 211 decides whether the reproducibility of the estimated causal structure model exceeds a threshold (S224). In a case in which the reproducibility exceeds the threshold (S224: YES), the causal-structure-model estimation program 211 counts the number of nodes in the output causal structure model (S225).

In a case in which the reproducibility is equal to or lower than a threshold (S224: NO), an added portion $\Delta T$ includes an abnormality value, and accordingly, the causal-structure-model estimation program 211 excludes the period from the learning period (S226). The causal-structure-model estimation program 211 computes the growth rate of the causal structure model (S227). The growth rate can be computed by (current number of nodes−last number of nodes)/current number of nodes. The causal-structure-model estimation program 211 compares the computed growth rate with a threshold (S228).

In a case in which the growth rate is equal to or higher than the threshold (S228: NO), the causal-structure-model estimation program 211 extends the learning period (t_1=t_1+$\Delta T$) (S229), and returns to Step S202. In a case in which the growth rate is lower than the threshold (S228: YES), the causal-structure-model estimation program 211 determines a learning period for estimating a causal structure model of the target system on the basis of the period [t_0, t_1]. For example, the period [t_0, t_1] is determined as the learning period for estimating a causal structure model of the target system (S230).

[Setting of Threshold of Normality/Abnormality Decision]

Next, a method of setting a threshold for performing a normality/abnormality decision by comparing an estimated value of a response variable according to a causal structure model and a measurement value is described. By setting an appropriate threshold, abnormalities of the monitoring-target system can be found appropriately.

Figure 20:
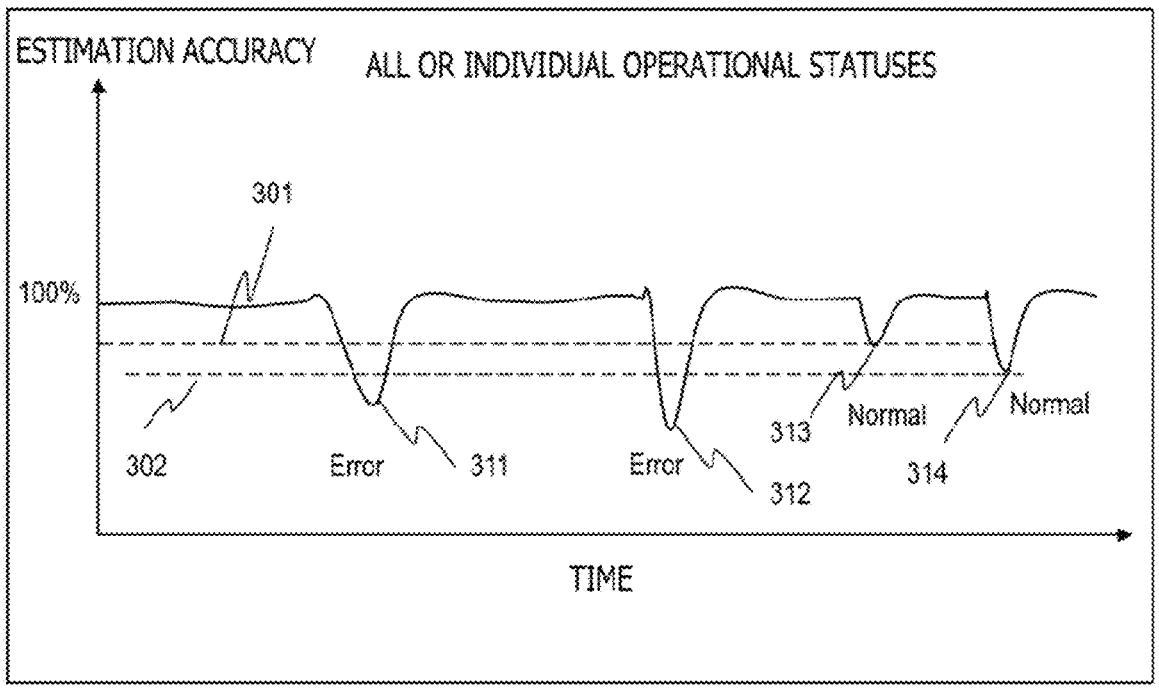
FIG. 20 is a graph illustrating a relation between thresholds and temporal changes of estimation accuracy, for explaining the overview of a threshold setting method.

FIG. 20 is a graph illustrating a relation between thresholds, and temporal changes of estimation accuracy, for explaining the overview of the threshold setting method. The estimation accuracy illustrated in the graph is estimation accuracy regarding any of operational statuses in a case in which thresholds are set for individual operational statuses, and estimation accuracy regarding all the operational statuses in a case in which a common threshold is set for all the operational statuses.

A threshold 301 matches a bottom point 313 of the estimation accuracy, and a threshold 302 matches a bottom point 314 of the estimation accuracy. The bottom points 311 and 312 are lower than the bottom point 314, and the bottom point 314 is lower than the bottom point 313. At the bottom points 311 and 312, the monitoring-target system is experiencing actual abnormalities. At the bottom points 313 and 314, the monitoring-target system is normal.

At the bottom point 314 corresponding to a value lower than the threshold 301, the monitoring-target system is normal. In contrast, at all the bottom points 311 and 312 which are lower than the threshold 302, the monitoring-target system is experiencing actual abnormalities. Accordingly, the threshold 302 is more appropriate than the threshold 301. By setting the threshold to the threshold 302, or updating the threshold that has been set to the threshold 301 to the threshold 302, more appropriate decisions become possible.

Figure 21:
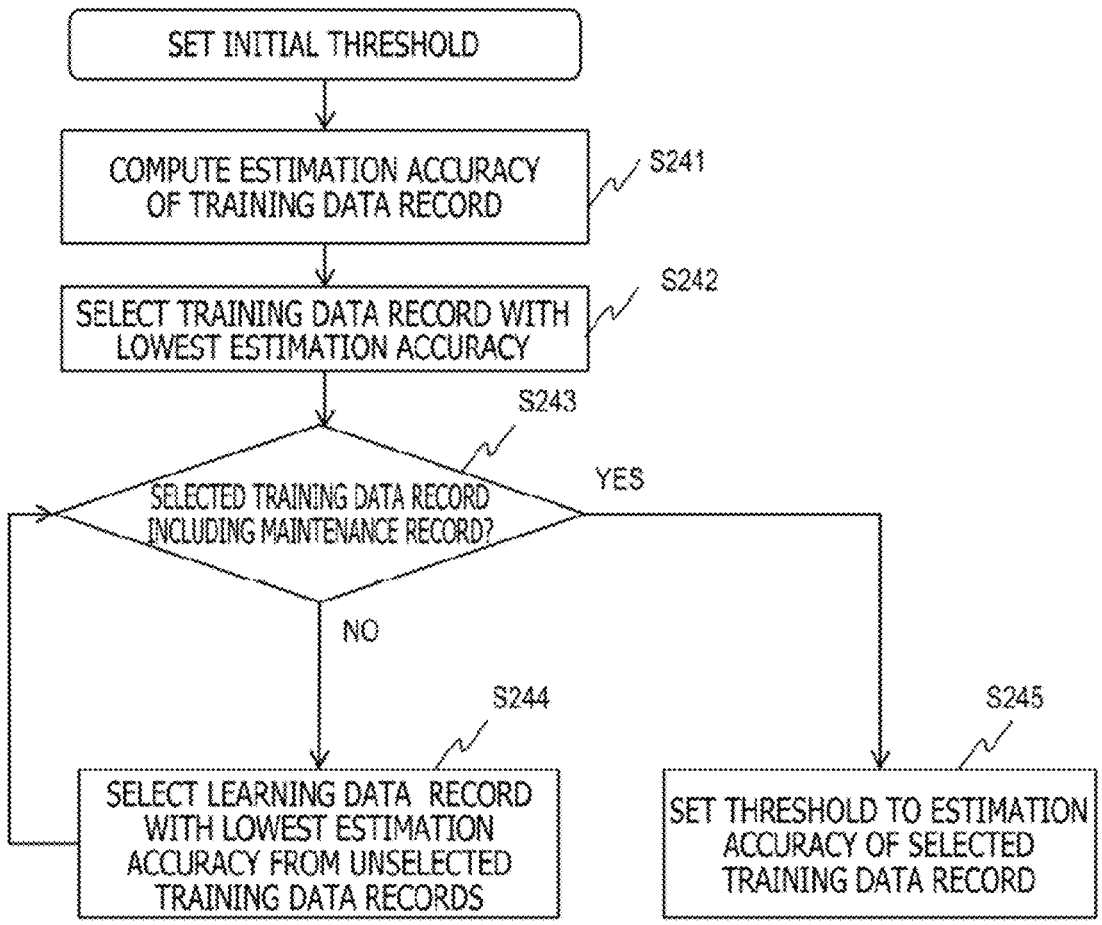
FIG. 21 illustrates a flowchart of initial threshold setting by the deviation decision program.

FIG. 21 illustrates a flowchart of initial threshold setting by the deviation decision program 232. The deviation decision program 232 computes estimation accuracy of each training data record according to the causal structure model (S241). The deviation decision program 232 selects a training data record with the lowest estimation accuracy (S242). The deviation decision program 232 decides whether the selected training data record includes a maintenance record (S243).

In a case in which the selected training data record does not include a maintenance record (S243: NO), the deviation decision program 232 selects a learning data record with the lowest estimation accuracy from unselected training data records (S244), and returns to Step S243. In a case in which the selected training data record includes a maintenance record (S243: YES), the deviation decision program 232 sets the threshold to the estimation accuracy of the selected training data record (S245). That a training data record includes a maintenance record means that an abnormality has occurred in the monitoring-target system.

Figure 22:
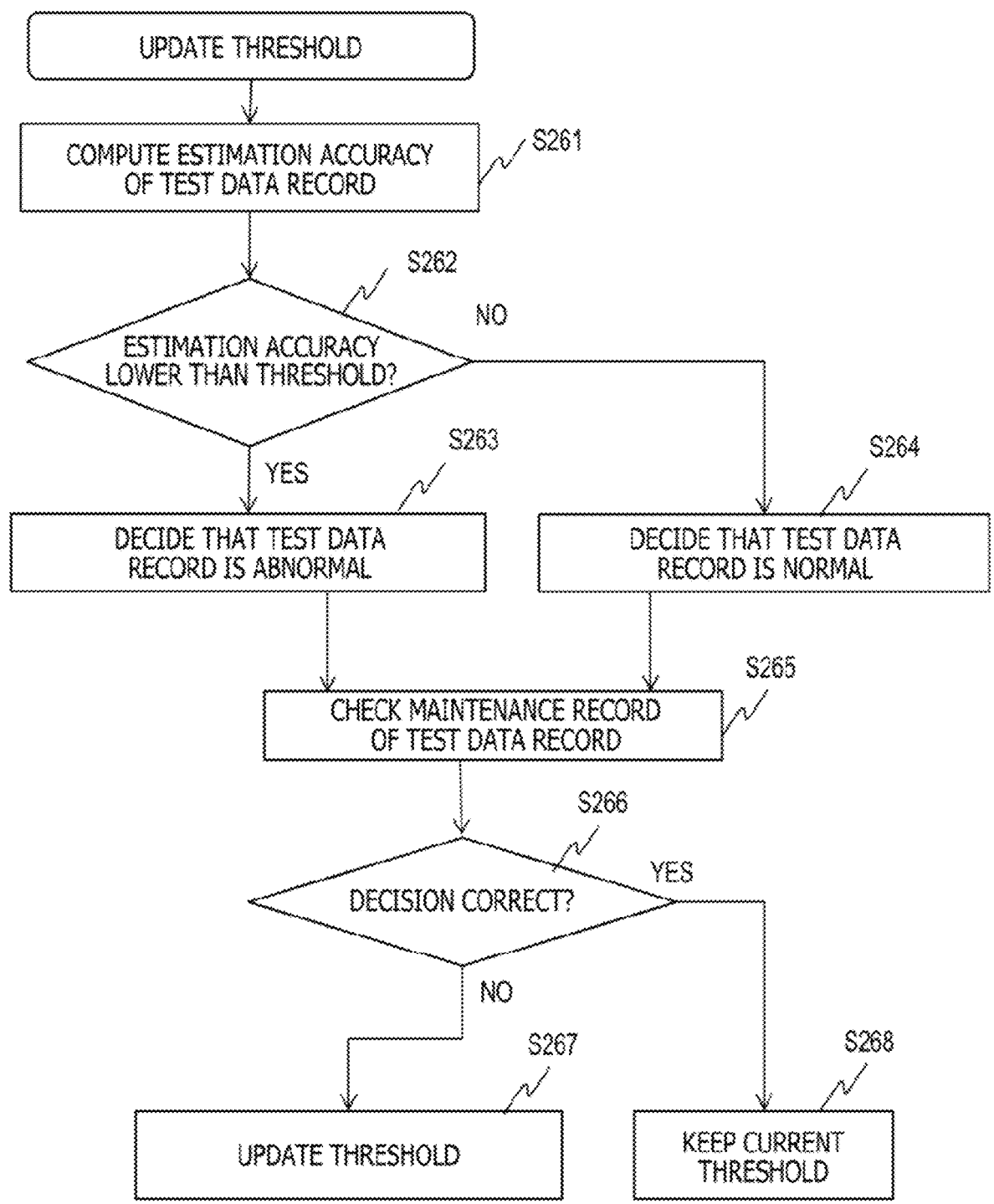
FIG. 22 illustrates a flowchart of threshold updating by the deviation decision program.

FIG. 22 illustrates a flowchart of threshold updating by the deviation decision program 232. The deviation decision program 232 computes the estimation accuracy of the test data record selected from the test data database 233 (S261). The deviation decision program 232 decides whether the estimation accuracy is lower than the threshold (S262).

In a case in which the estimation accuracy is lower than the threshold (S262: YES), the deviation decision program 232 decides that the test data record is abnormal (S263). In a case in which the estimation accuracy is equal to or higher than the threshold (S262: NO), the deviation decision program 232 decides that the test data record is normal (S264).

The deviation decision program 232 checks a maintenance record of the test data record (S265). In the present example, test data records include fields that store maintenance records of the test data records. On the basis of whether or not there is a maintenance record, the deviation decision program 232 decides whether the normality/abnormality decision based on the estimation accuracy is correct (S266).

Specifically, in a case in which the decision based on the estimation accuracy is that the test data record is abnormal, if there is a maintenance record, the decision is correct, and if there are no maintenance records, the decision is not correct. In a case in which the decision is correct (S266: YES), the deviation decision program 232 keeps the current threshold (S268). In a case in which the decision is not correct (S266: NO), the deviation decision program 232 updates the threshold on the basis of the estimation accuracy of the test data record. For example, the estimation accuracy of the test data record is set as a new threshold (S267).

[Estimation of Causal Structure Model According to Operational Status]

Next, an estimation of a causal structure model according to each operational status of the monitoring-target system is described. By using a causal structure model according to each operational status, more appropriate normality/abnormality decisions become possible.

Figures 23, 24:
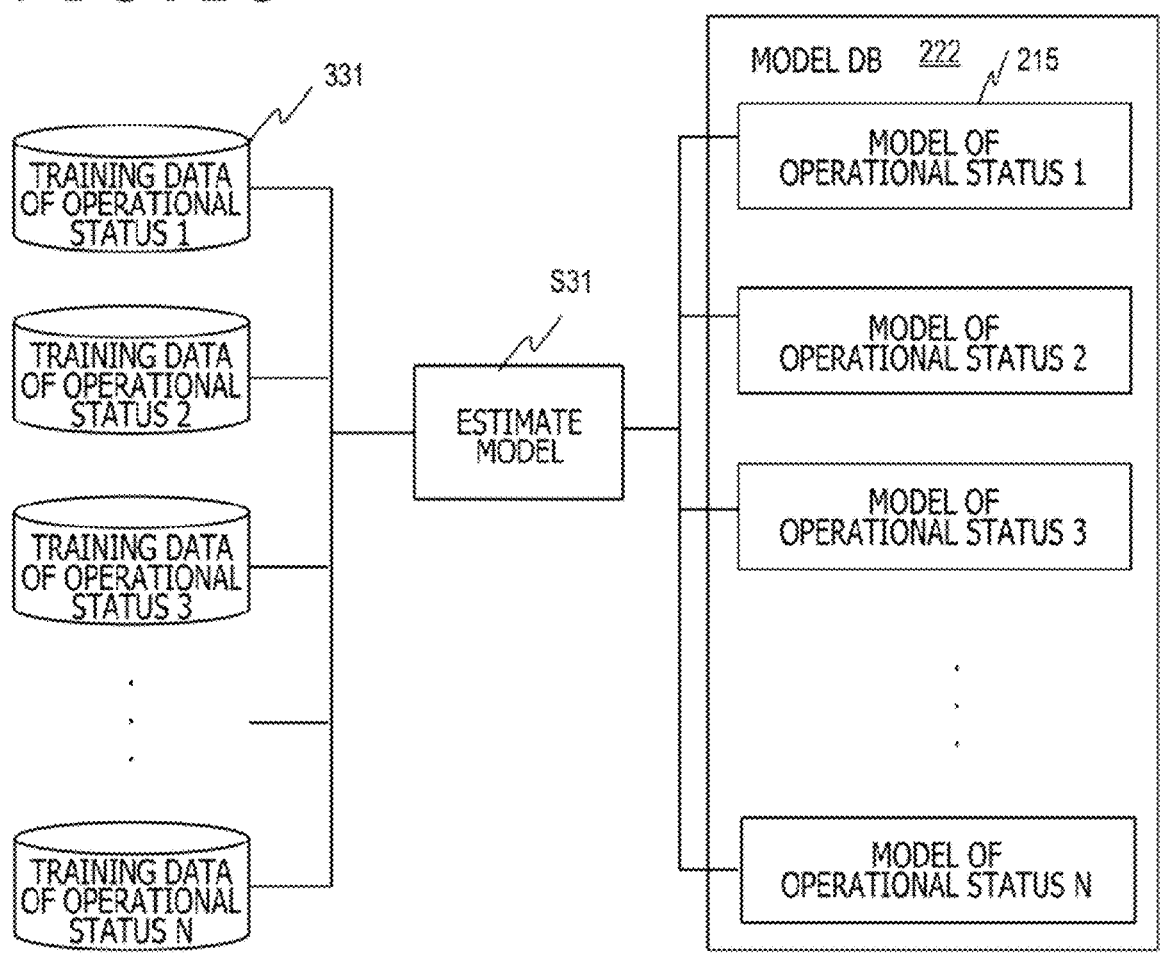
FIG. 23 is a diagram for explaining an estimation of a causal structure model of each operational status of a monitoring-target system.
FIG. 24 illustrates a configuration example of a training data database.

FIG. 23 is a figure for explaining an estimation of a causal structure model of each operational status of the monitoring-target system. The causal-structure-model estimation program 211 acquires training data 331 of each operational status from the training data database 212, and estimates a causal structure model 215 of each operational status (S31).

In FIG. 23, there are pieces of training data relating to an operational status 1 to an operational status N, and, as an example, the training data of the operational status 1 is denoted by a reference numeral 331. In addition, a causal structure model of each of the operational status 1 to the operational status N is estimated, and, as an example, the causal structure model of the operational status 1 is denoted by a reference numeral 215.

FIG. 24 illustrates a configuration example of the training data database 212. The training data database 212 includes a plurality of training data records 351. In FIG. 24, one training record is denoted by a reference numeral 351, as an example. The training data record 351 includes information regarding statuses of the monitoring-target system, values obtained from data measured by sensors, and a maintenance record.

The training data database 212 includes time fields 352, fields 353 indicating statuses (operational statuses) of the monitoring-target system, fields 354 of measurement data, and fields 355 of maintenance records. In the example illustrated in FIG. 24, dates are omitted. Contents of the time fields 352, the fields 353 indicating statuses (operational statuses) of the monitoring-target system, and the fields 354 of measurement data are similar to those in the test data database 233 described with reference to FIG. 7.

Figures 25, 26:
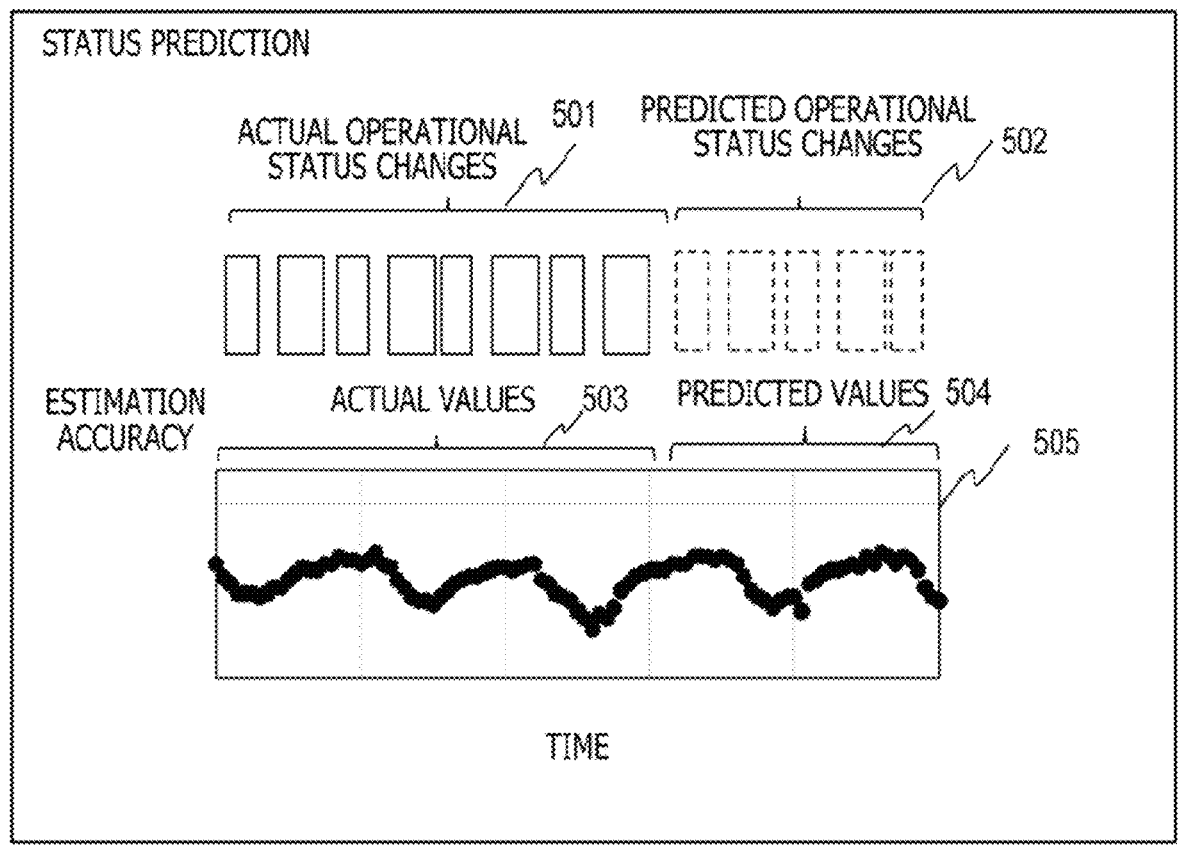
FIG. 25 illustrates training data of an operational status.
FIG. 26 schematically illustrates a relation between operational status changes and estimation accuracy.

FIG. 25 illustrates the training data 331 of the operational status 1. Operational statuses of the monitoring-target system are defined by values of multiple types of statuses (status A, status B, . . . ). A different value of any one status (field) represents a different operational status. The training data 331 of a particular operational status may be selected from the training data database 212 at the time of an estimation of a causal structure model, or training data of each operational status may be classified in advance in the training data database 212.

[Prediction of Future Response Variable Value]

Next, a causal structure model that outputs a predicted value of a response variable at a future time when the causal structure model receives an input of the time is described. Thereby, an occurrence of an abnormality in the future in the monitoring-target system can be predicted. Users can prevent occurrences of abnormalities. The causal-structure-model estimation program 211 constructs a causal structure model that can predict temporal changes of a monitoring-target response variable. On the basis of the causal structure model and time information, the response-variable-value estimation program 231 predicts temporal changes of the monitoring-target response variable.

FIG. 26 schematically illustrates a relation between operational status changes and estimation accuracy. The response-variable-value estimation program 231 searches the training data database 212 for operational status changes with a pattern similar to a pattern of past actual operational status changes 501, and applies operational status changes after the found operational status changes to predicted operational status changes 502. Operational status changes can be represented by vectors, and the response-variable-value estimation program 231 can select operational status changes with a similar pattern on the basis of similarities between vectors. For example, operational status changes with a pattern with the highest similarity or a pattern with a similarity exceeding a threshold are selected.

The response-variable-value estimation program 231 selects a causal structure model corresponding to each operational status of the predicted operational status change 502, and computes a predicted value of a monitoring-target response variable. In a graph 505 that illustrates temporal changes of the estimation accuracy, a range 503 illustrates past measurement values, and a range 504 illustrates predicted values. The range 503 and the range 504 correspond to the actual operational status changes 501 and the predicted operational status changes 502, respectively.

Figures 27, 28:
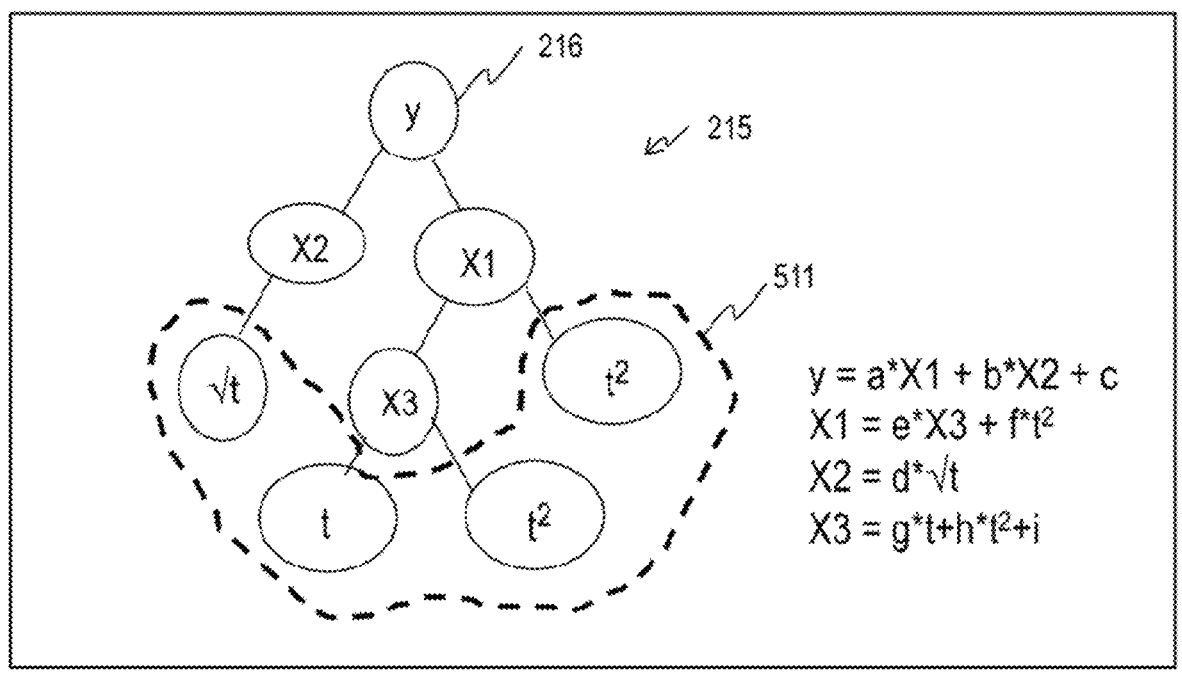
FIG. 27 illustrates a configuration example of the training data database that stores training data for estimating a causal structure model that can predict temporal changes of a monitoring-target response variable.
FIG. 28 illustrates an example causal structure model that can predict temporal changes of the monitoring-target response variable.

FIG. 27 illustrates a configuration example of the training data database 212 that stores training data for estimating a causal structure model that can predict temporal changes of a monitoring-target response variable. The training data database 212 includes fields of times in the fields 354 of measurement data.

FIG. 28 illustrates an example causal structure model 215 that can predict temporal changes of the monitoring-target response variable. In the causal structure model 215, lowermost-layer nodes (nodes below which there are no cause nodes) 511 are represented by functions of times. In the estimation of the causal structure model described with reference to FIG. 17, in a case in which measurement values of explanatory-variable nodes are times, the causal-structure-model estimation program 211 determines those nodes as lowermost-layer nodes. The response-variable-value estimation program 231 inputs a time to lowermost-layer nodes 511 and determines a predicted value of the node 216 of the monitoring-target response variable.

Figure 29:
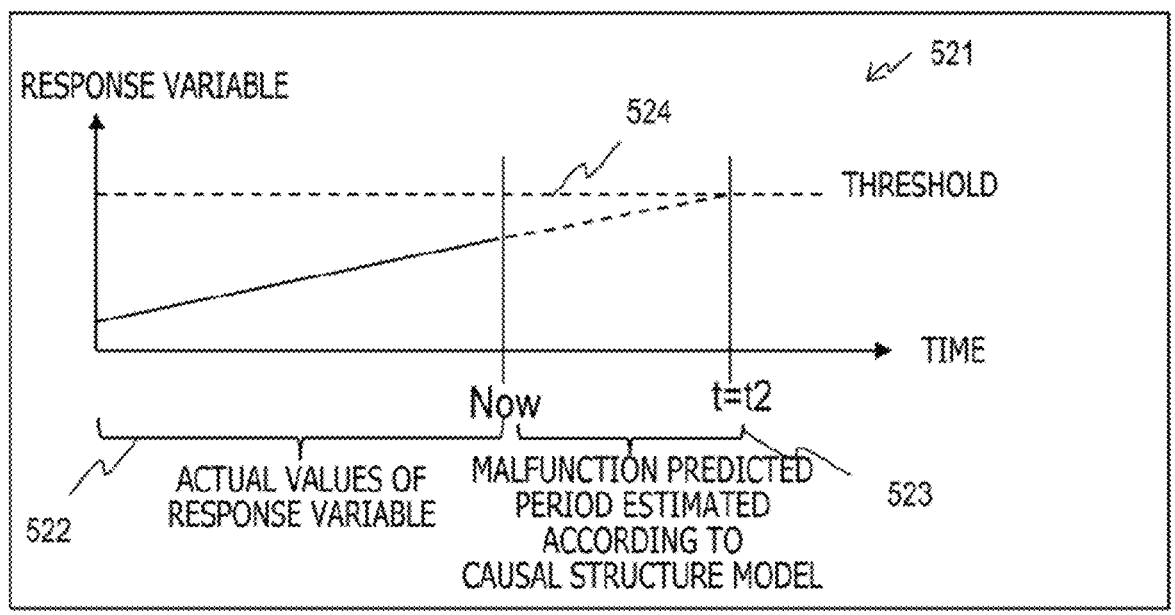
FIG. 29 illustrates a display example of predicted values of the response variable according to the causal structure model.

FIG. 29 illustrates a display example of predicted values of the response variable according to the causal structure model 215. The client apparatus 240 acquires the image data from the response-variable-value estimation program 231 and displays the image on the output device 317.

In a graph 521, the horizontal axis indicates times, and the vertical axis indicates the response variable. A range 522 indicates measurement values of the response variable, and a range 523 indicates predicted values of the response variable. In the range 523, values of the response variable are output values of the causal structure model 215 that are output when the causal structure model 215 receives inputs of times. The predicted value at a time t2 reaches a threshold 524. The response-variable-value estimation program 231 determines a time at which the predicted value reaches the threshold as an abnormality occurrence prediction time and presents the time to a user.

[Monitoring Image]

Figure 30:
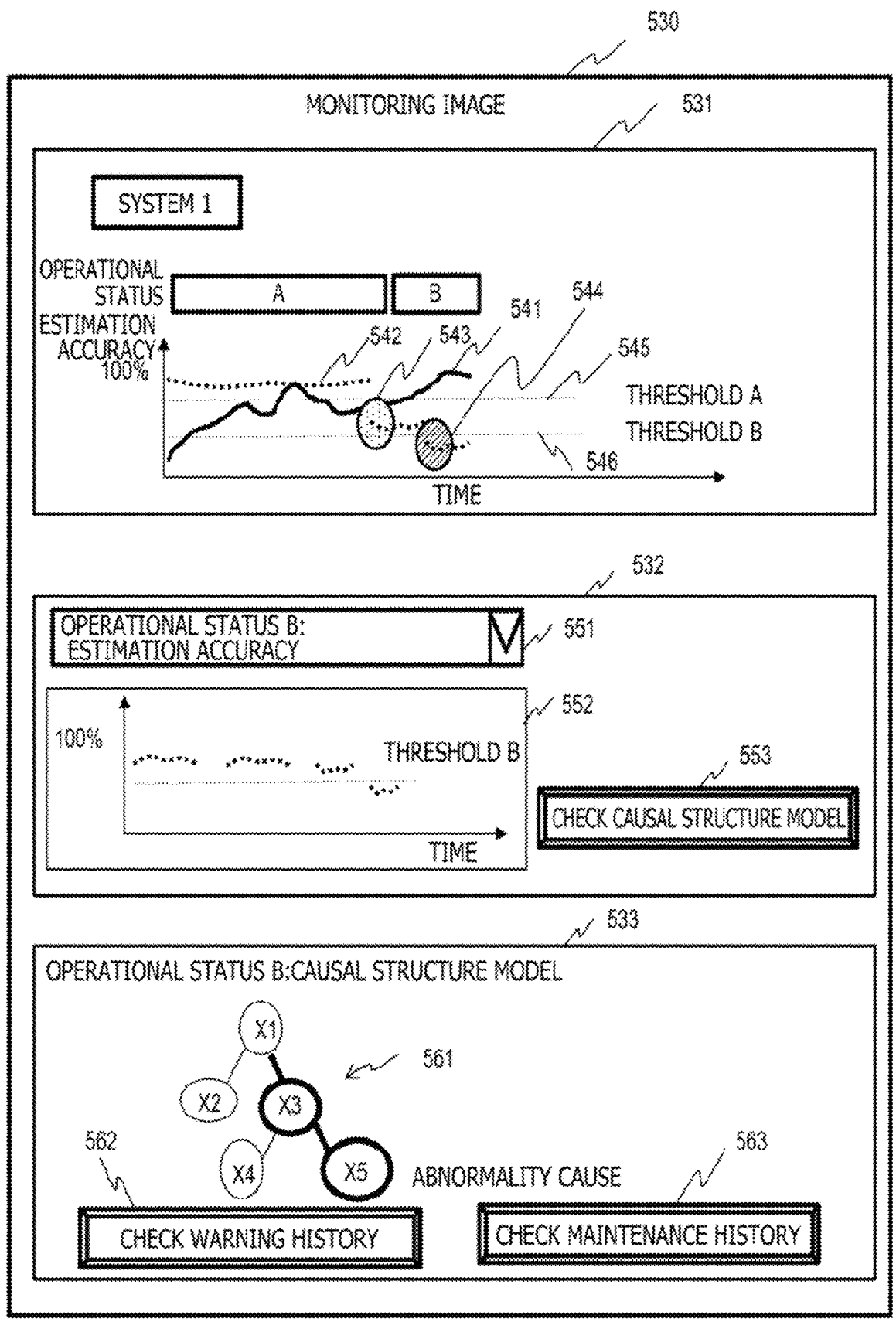
FIG. 30 illustrates an example monitoring image.

Next, an example monitoring image displayed on the client apparatus 240 is described. FIG. 30 illustrates an example monitoring image 530. In a case in which an abnormality has been detected according to a causal structure model, the monitoring image 530 displays an abnormality occurrence portion, and furthermore displays a deviation between an estimated value and a measurement value of the abnormal portion. The monitoring image 530 includes sections 531, 532, and 533.

The section 531 illustrates temporal changes 541 of measurement values of a monitoring-target response variable of the monitoring-target system (system 1), and temporal changes 542 of estimated values of the monitoring-target response variable. The temporal changes 541 of the measurement values are represented by a solid line, and the temporal changes 542 of the estimated values are represented by broken lines. The section 531 illustrates values of a plurality of operational statuses of the monitoring-target system. In the example illustrated in FIG. 30, measurement values and estimated values of an operational status A and measurement values and estimated values of an operational status B that follows the operational status A are illustrated.

The section 531 indicates, with broken lines, a threshold A545 for normality/abnormality decisions in the operational status A, and a threshold B546 for normality/abnormality decisions in the operational status B. The section 531 further indicates, with circles filled with hatching patterns, an abnormal portion 543 in the operational status A, and an abnormal portion 544 in the operational status B. The abnormal portion 543 is filled with a dot pattern, and the abnormal portion 544 is filled with a diagonal line pattern. A diagonal line pattern is more visually recognizable than a dot pattern.

In the section 532, a user can select an operational status in a list box 551. In the example illustrated in FIG. 30, the operational status B is selected. The section 532 displays a graph 552 of temporal changes of estimated values of the selected operational status.

The section 531 indicates an abnormal portion of the operational status selected in the list box 551 with an image that is more visually recognizable than an image of an abnormal portion of an unselected operational status. In the example illustrated in FIG. 30, an abnormal portion of the operational status selected in the list box 551 is illustrated with a diagonal line pattern, and an abnormal portion of the unselected operational status is indicated with a dot pattern. In a case in which no operational statuses are selected, the section 531 indicates the first abnormal portion with a highly visually recognizable pattern and indicates other abnormal portions with less visually recognizable patterns.

The section 532 includes a button 553. When the button 553 is selected by a user, the section 533 displays a causal structure model 561 of the operational status selected in the list box 551. The causal structure model 561 further indicates abnormality-cause candidate nodes clearly. In the example illustrated in FIG. 30, abnormality cause candidate nodes (X3 and X5) are indicated with bold lines.

The section 533 includes buttons 562 and 563. When the button 562 is selected by a user, a warning history of the operational status B is displayed. In addition, when the button 563 is selected, a system maintenance history in the operational status B is displayed.

As mentioned above, in monitoring of the monitoring-target system, the monitoring image 530 can easily and appropriately present a detected abnormality, and a candidate node of a cause of the abnormality to a user. Data for creating the monitoring image 530 is transmitted from the test-data-deviation deciding apparatus 230 to the client apparatus 240.

FIG. 31 illustrates an example warning message 600. The warning message 600 includes warning contents 601, and buttons 602 to 605. The warning contents 601 indicate details of the warning. When the button 602 is selected, a causal structure model which is the target of the warning message is displayed. When a button 603 is selected, a maintenance-record input image is displayed. When the button 604 is selected, a history of warning messages including the warning message is displayed. When the button 605 is selected, a measurement value history and an estimated-value history in monitoring of a corresponding response variable are displayed.

FIG. 32 illustrates a maintenance-record input image 620. A user inputs necessary information on the maintenance-record input image 620. The input information is transmitted to the test-data-deviation deciding apparatus 230, and stored in the auxiliary storage apparatus 313. In addition, part of the input information is stored in the test data database 233.

Note that the present invention is not limited to the embodiments described above, but includes various modification examples. For example, the embodiments described above are described in detail in order to explain the present invention in an easy-to-understand manner, and embodiments of the present invention are not necessarily limited to the ones including all the configurations that are described. In addition, some of the configurations of an embodiment can be replaced with configurations of another embodiment, and also configurations of an embodiment can be added to the configurations of another embodiment. In addition, some of the configurations of each embodiment can can be added, removed, or replaced with other configurations.

In addition, the configurations, functions, processing sections, and the like described above may partially or entirely be realized by hardware by designing them in an integrated circuit, or by other means, for example. In addition, the configurations, functions, and the like described above may be achieved by software by a processor interpreting and executing programs that achieve the functions. Information such as programs, tables or files that achieve the functions can be stored in a recording apparatus such as a memory, a hard disk, or a SSD (Solid State Drive), or in a recording medium such as an IC card or an SD card. In addition, control lines and information lines that are considered as being necessary for explanation are illustrated, and all the control lines and information lines that are necessary for achieving products are not necessarily illustrated. In actual use, it may be considered that almost all the configurations are interconnected.

The invention claimed is:

1. A monitoring system that monitors a monitoring-target system, the monitoring system comprising:
one or more storage apparatuses that store a program; and
one or more processors that operate according to the program, wherein
the one or more processors
determine an estimated value of a monitoring-target response variable of the monitoring-target system on a basis of measurement data included in test data of the monitoring-target system and a first causal structure model of the monitoring-target system, and
decide whether an abnormality has occurred in the monitoring-target system on a basis of a result of a comparison between a measurement value of the monitoring-target response variable included in the test data and the estimated value,
wherein the one or more storage apparatuses store causal structure models of a plurality of different operational statuses,
wherein the one or more processors select the first causal structure model from the causal structure models of the plurality of different operational statuses on a basis of similarities between an operational status of the monitoring-target system indicated by the test data and the plurality of different operational statuses,
wherein the first causal structure model includes a lower-layer node corresponding to the measurement data, a monitoring-target response-variable node that is in a layer higher than the lower-layer node and that corresponds to the monitoring-target response variable, and an intermediate node between the lower-layer node and the monitoring-target response-variable node, and
wherein the one or more processors
determine, as the estimated value, a value of the monitoring-target response-variable node obtained by inputting the measurement data to the lower-layer node,
search the first causal structure model for an abnormality-cause-node candidate from the monitoring-target response-variable node along an edge, and
decide, in the search, whether each explanatory-variable node whose response-variable node is a node decided as an abnormality-cause-node candidate is an abnormality-cause-node candidate.

2. The monitoring system according to claim 1, wherein the one or more processors estimate the causal structure models on a basis of training data including measurement data of the monitoring-target system.

3. The monitoring system according to claim 2, wherein the one or more processors
determine a learning period of a second causal structure model of a second system different from the monitoring-target system on a basis of a growth rate of the second causal structure model, and
select, on a basis of the learning period, training data to be used for estimating the first causal structure model of the monitoring-target system.

4. The monitoring system according to claim 1, wherein on a basis of a deviation between a measurement value of the intermediate node included in the test data for determining the estimated value and a value obtained from a past measurement value of the intermediate node, the one or more processors decide whether the intermediate node is an abnormality-cause-node candidate.

5. The monitoring system according to claim 4, wherein on a basis of a deviation between a measurement value of the lower-layer node included in the test data for determining the estimated value and a value obtained from a past measurement value of the lower-layer node, the one or more processors decide whether the lower-layer node is an abnormality-cause-node candidate.

6. The monitoring system according to claim 4, wherein the one or more processors decide a node with a largest deviation as an abnormality-cause-node candidate.

7. The monitoring system according to claim 1, wherein on a basis of a deviation between a measurement value of the intermediate node included in the test data for determining the estimated value and an estimated value of the intermediate node obtained by inputting the measurement data to the lower-layer node, the one or more processors decide whether the intermediate node is an abnormality-cause-node candidate.

8. The monitoring system according to claim 1, wherein the one or more processors
decide whether an abnormality has occurred in the monitoring-target system on a basis of a result of a comparison between a deviation between a measurement value of the monitoring-target response variable and the estimated value, and a threshold; and
change the threshold on a basis of the deviation in a case in which the deviation is larger than the threshold and maintenance of the monitoring system is not executed.

9. The monitoring system according to claim 1, wherein the one or more processors determine a predicted value of the monitoring-target response variable at a particular future time according to a second causal structure model,
the second causal structure model includes a time function node represented by a time function, a second monitoring-target response-variable node that is in a layer higher than the time function node and that corresponds to the monitoring-target response variable, and a second intermediate node between the time function node and the second monitoring-target response-variable node, and
the one or more processors determine, as the predicted value, a value of the second monitoring-target response-variable node obtained by inputting the particular time to the time function node.

10. The monitoring system according to claim 1, further comprising:
an output device that outputs a monitoring image, wherein a measurement-value history and an estimated-value history of the monitoring-target response variable, and an abnormality-cause-node candidate in the first causal structure model are output on the output device.

11. A method by which a monitoring system monitors a monitoring-target system, the method comprising:
determining, by the monitoring system, an estimated value of a monitoring-target response variable of the monitoring-target system on a basis of measurement data included in test data of the monitoring-target system and a first causal structure model of the monitoring-target system; and
deciding, by the monitoring system, whether an abnormality has occurred in the monitoring-target system on a basis of a result of a comparison between a measurement value of the monitoring-target response variable included in the test data and the estimated value,
wherein one or more storage apparatuses store causal structure models of a plurality of different operational statuses,
wherein one or more processors select the first causal structure model from the causal structure models of the plurality of different operational statuses on a basis of similarities between an operational status of the monitoring-target system indicated by the test data and the plurality of different operational statuses,
wherein the first causal structure model includes a lower-layer node corresponding to the measurement data, a monitoring-target response-variable node that is in a layer higher than the lower-layer node and that corresponds to the monitoring-target response variable, and an intermediate node between the lower-layer node and the monitoring-target response-variable node, and
wherein the one or more processors
determine, as the estimated value, a value of the monitoring-target response-variable node obtained by inputting the measurement data to the lower-layer node,
search the first causal structure model for an abnormality-cause-node candidate from the monitoring-target response-variable node along an edge, and
decide, in the search, whether each explanatory-variable node whose response-variable node is a node decided as an abnormality-cause-node candidate is an abnormality-cause-node candidate.

* * * * *